US011729781B2

(12) United States Patent
Pelletier et al.

(10) Patent No.: US 11,729,781 B2
(45) Date of Patent: Aug. 15, 2023

(54) STANDALONE L2 PROCESSING AND CONTROL ARCHITECTURE IN 5G FLEXIBLE RAT SYSTEMS

(71) Applicant: InterDigital Patent Holdings, Inc., Wilmington, DE (US)

(72) Inventors: Benoit Pelletier, Roxboro (CA); Martino M. Freda, Laval (CA); Ghyslain Pelletier, Montreal (CA); Diana Pani, Montreal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/089,960

(22) PCT Filed: Mar. 28, 2017

(86) PCT No.: PCT/US2017/024568
§ 371 (c)(1),
(2) Date: Sep. 28, 2018

(87) PCT Pub. No.: WO2017/172789
PCT Pub. Date: Oct. 5, 2017

(65) Prior Publication Data
US 2019/0116582 A1    Apr. 18, 2019

Related U.S. Application Data

(60) Provisional application No. 62/315,165, filed on Mar. 30, 2016.

(51) Int. Cl.
*H04W 72/23*   (2023.01)
*H04W 72/51*   (2023.01)
*H04W 72/56*   (2023.01)

(52) U.S. Cl.
CPC .......... *H04W 72/23* (2023.01); *H04W 72/51* (2023.01); *H04W 72/56* (2023.01)

(58) Field of Classification Search
CPC ............... H04L 1/1812; H04W 16/02; H04W 28/0268; H04W 72/02; H04W 72/042;
(Continued)

(56) References Cited

U.S. PATENT DOCUMENTS 7,061,929 B1 *   6/2006   Eberle ................. H04L 12/5692
                                                   370/423
9,345,019 B2    5/2016   Chou et al.
(Continued)

FOREIGN PATENT DOCUMENTS

CN        102612093 A    7/2012
EP         2182770 A2    5/2010
(Continued)

OTHER PUBLICATIONS

3rd Generation Partnership Project (3GPP), TR 38.913 V0.2.0, "Technical Specification Group Radio Access Network, Study on Scenarios and Requirements for Next Generation Access Technologies (Release 14)", Feb. 2016, 19 pages.
(Continued)

*Primary Examiner* — Khoa Huynh
(74) *Attorney, Agent, or Firm* — Flaster Greenberg, P.C.

(57) ABSTRACT

A wireless transmit/receive unit (WTRU) and corresponding method is disclosed. The WTRU is in communication with a wireless communication network, the WTRU comprising: a memory; a receiver, the receiver configured at least to: receive a configuration, the configuration including one or more characteristics for one or more transmission modes (TMs) of the WTRU; a processor, the processor configured at least to: select, dynamically, at least one TM of the one or more TMs for a transmission of an uplink data unit, the
(Continued)

dynamic selection being based on one or more data transfer requirements and the one or more TM characteristics; identify at least one transport channel associated with the at least one TM; and map the uplink data unit to the at least one transport channel; and a transmitter, the transmitter configured at least to: send the transmission of the uplink data unit to one or more devices of the wireless communication network.

14 Claims, 20 Drawing Sheets

(58) Field of Classification Search
    CPC ........... H04W 72/044; H04W 72/0446; H04W
                  72/048; H04W 72/08; H04W 72/10;
                  H04W 72/1226; H04W 72/1257
    See application file for complete search history.

(56) References Cited

U.S. PATENT DOCUMENTS

| | | | |
|---|---|---|---|
| 9,723,596 | B2 | 8/2017 | Zhang et al. |
| 9,788,358 | B2 | 10/2017 | Pelletier et al. |
| 9,807,795 | B2 | 10/2017 | Jeong et al. |
| 9,844,071 | B2 | 12/2017 | Ostergaard et al. |
| 2002/0137520 | A1 | 9/2002 | Dillon et al. |
| 2004/0162083 | A1 | 8/2004 | Chen et al. |
| 2005/0222884 | A1 | 10/2005 | Ehret et al. |
| 2009/0116434 | A1 | 5/2009 | Lohr et al. |
| 2009/0225711 | A1 | 9/2009 | Sammour et al. |
| 2010/0135229 | A1* | 6/2010 | Lohr ................. H04W 72/1284 370/329 |
| 2011/0310759 | A1 | 12/2011 | Gerstenberger et al. |
| 2012/0120880 | A1* | 5/2012 | Lee ....................... H04W 72/02 370/329 |
| 2012/0281566 | A1 | 11/2012 | Pelletier et al. |
| 2013/0242730 | A1 | 9/2013 | Pelletier et al. |
| 2014/0036808 | A1 | 2/2014 | Pelletier et al. |
| 2014/0126527 | A1 | 5/2014 | Xiong et al. |
| 2014/0128092 | A1 | 5/2014 | Xiong et al. |
| 2014/0133410 | A1* | 5/2014 | Nguyen ............... H04W 72/087 370/329 |
| 2014/0198677 | A1 | 7/2014 | Xu et al. |
| 2014/0269767 | A1 | 9/2014 | Djukic et al. |
| 2015/0087414 | A1* | 3/2015 | Chen .................... A63F 13/355 463/31 |
| 2015/0103703 | A1 | 4/2015 | Zeng et al. |
| 2015/0124743 | A1 | 5/2015 | Damnjanovic et al. |
| 2015/0156769 | A1* | 6/2015 | Mazzarese .......... H04W 72/042 370/329 |
| 2015/0180786 | A1 | 6/2015 | Chen et al. |
| 2015/0271809 | A1 | 9/2015 | Kato et al. |
| 2015/0282213 | A1 | 10/2015 | Sun et al. |
| 2016/0020891 | A1 | 1/2016 | Jung et al. |
| 2016/0021581 | A1 | 1/2016 | Deenoo et al. |
| 2016/0050680 | A1 | 2/2016 | Simonsson et al. |
| 2016/0066316 | A1 | 3/2016 | Bhushan et al. |
| 2016/0183276 | A1 | 6/2016 | Marinier et al. |
| 2016/0192354 | A1 | 6/2016 | Wei et al. |
| 2016/0233986 | A1 | 8/2016 | Lee et al. |
| 2017/0079059 | A1* | 3/2017 | Li ......................... H04W 16/02 |
| 2017/0164238 | A1* | 6/2017 | Paredes Cabrera ..... H04L 69/22 |
| 2017/0215170 | A1* | 7/2017 | Islam .................. H04L 27/2601 |
| 2017/0290008 | A1 | 10/2017 | Tooher et al. |
| 2018/0048498 | A1 | 2/2018 | Stern-Berkowitz et al. |
| 2018/0249513 | A1 | 8/2018 | Chang et al. |
| 2018/0376474 | A1* | 12/2018 | Khoryaev ............. H04W 76/14 |
| 2019/0124674 | A1 | 4/2019 | Lee et al. |

FOREIGN PATENT DOCUMENTS

| | | | |
|---|---|---|---|
| EP | 2744290 A1 | 6/2014 | |
| JP | 2012-157036 A | 8/2012 | |
| JP | 2015-520533 A | 7/2015 | |
| JP | 2015-530042 A | 10/2015 | |
| RU | 2391795 C2 | 6/2010 | |
| RU | 2517434 C2 | 5/2014 | |
| TW | 201521487 A | 6/2015 | |
| WO | WO 2007/092245 A2 | 8/2007 | |
| WO | 2008/024283 A2 | 2/2008 | |
| WO | 2011/100681 A1 | 8/2011 | |
| WO | 2013/139299 A1 | 9/2013 | |
| WO | WO 2013/181515 A2 | 12/2013 | |
| WO | 2014/031989 A1 | 2/2014 | |
| WO | 2014/054568 A1 | 4/2014 | |
| WO | 2016/040290 A1 | 3/2016 | |

OTHER PUBLICATIONS

3rd Generation Partnership Project (3GPP), TS 36.300 V13.2.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 13)", Dec. 2015, 290 pages.
3rd Generation Partnership Project (3GPP), TS 36.321 V8.12.0, "Technical Specification Group Radio Access Network, Evolved Universal Terrestrial Radio Access (E-UTRA), Medium Access Control (MAC) Protocol Specification (Release 8)", Mar. 2012, 47 pages.
3rd Generation Partnership Project, R1-155801, "Overview on Design of Uplink for NB-IoT", LG Electronics, 3GPP TSG RAN WG1 Meeting #82-bis, Malmo, Sweden, Oct. 5-9, 2015, 6 pages.
3rd Generation Partnership Project, R1-157370, "UL Numerology and Frame Structure Design", MediaTek Inc., 3GPP TSG RAN WG1 Meeting #83, Anaheim, USA, Nov. 15-22, 2015, 4 pages.
3rd Generation Partnership Project (3GPP), R2-062226, "Improved QoS Handling for UL Scheduling", Lucent Technologies, 3GPP TSG-RAN WG2 Meeting #54, Tallinn, Estonia, Aug. 28-Sep. 1, 2006, 4 pages.
3rd Generation Partnership Project (3GPP), R2-151455, "MAC Impact for Supporting UL Transmission on LAA SCell", Fujitsu, 3GPP TSG-RAN WG2 Meeting#89bis, Bratislava, Slovakia, Apr. 20-24, 2015, pp. 1-5.
3rd Generation Partnership Project (3GPP), TS 36.213 V13.0.1, "Technical Specification Group Radio Access Network, Evolved Universal Terrestrial Radio Access (E-UTRA), Physical Layer Procedures (Release 13)", Jan. 2016, pp. 1-326.
3rd Generation Partnership Project (3GPP), TS 36.300 V12.8.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 12)", Dec. 2015, pp. 1-254.
3rd Generation Partnership Project (3GPP), TS 36.321 V13.0.0, "Technical Specification Group Radio Access Network, Evolved Universal Terrestrial Radio Access (E-UTRA), Medium Access Control (MAC) Protocol Specification (Release 13)", Dec. 2015, pp. 1-82.
3rd Generation Partnership Project (3GPP), TS 36.331 V12.8.0, "Technical Specification Group Radio Access Network, Evolved Universal Terrestrial Radio Access (E-UTRA), Radio Resource Control (RRC), Protocol Specification Release 12)", Dec. 2015, pp. 1-456.
CN 102612093 A, Internal Search dated Dec. 9, 2016, in related U.S. Appl. No. 62/315,373.
JP 2012-157036 A, US 2009/0116434 A1.
JP 2015-520533 A, U.S. Pat. No. 9,345,019 B2.
JP 2015-530042 A, U.S. Pat. No. 9,788,358 B2.
RU 2517434 C2, U.S. Pat. No. 9,844,071 B2.
TW 201521487 A, US 2016/0183276 A1.
3rd Generation Partnership Project (3GPP), "Technical Specification Group Radio Access Network; UE Radio Access capabilities (Release 6)", 3GPP TS 25.306 V6.13.0, Mar. 2009, 34 pages.
3rd Generation Partnership Project (3GPP), "Technical Specification Group Radio Access Network; UE Radio Access capabilities (Release 12)", 3GPP TS 25.306 V12.5.0, Mar. 2015, 75 pages.

(56) References Cited

OTHER PUBLICATIONS

3rd Generation Partnership Project (3GPP), "Technical Specification Group Radio Access Network; Medium Access Control (MAC) protocol specification (Release 6)", 3GPP TS 25.321 V6.18.0, Mar. 2009, 95 pages.
3rd Generation Partnership Project (3GPP), "Technical Specification Group Radio Access Network; Medium Access Control (MAC) protocol specification (Release 12)" 3GPP TS 25.321 V12.2.0, Dec. 2014, 214 pages.
3rd Generation Partnership Project (3GPP), "Technical Specification Group Radio Access Network; Radio Resource Control (RRC); Protocol specification (Release 12)", 3GPP TS 25.331 V12.7.0, Sep. 2015, 1503 pages.
3rd Generation Partnership Project (3GPP), "Technical Specification Group Radio Access Network; Radio Resource Control (RRC); Protocol Specification (Release 6)", 3GPP TS 25.331, V6.26.0, Dec. 2011, 1254 pages.

* cited by examiner

STANDALONE L2 PROCESSING AND CONTROL ARCHITECTURE IN 5G FLEXIBLE RAT SYSTEMS

CROSS-REFERENCE TO RELATED APPLICATIONS

This application is the National Stage entry under 35 U.S.C. § 371 of Patent Cooperation Treaty Application No. PCT/US2017/024568, filed Mar. 28, 2017, which claims the benefit of U.S. Provisional Patent Application No. 62/315,165, filed on Mar. 30, 2016, the contents of which being hereby incorporated by reference as if fully set-forth herein in its respective entirety, for all purposes.

BACKGROUND

Mobile communications are in continuous evolution and is already at the doorstep of its fifth incarnation—5G. As with previous generations, new use cases largely contributed in setting the requirements for the new system. It is expected that the 5G air interface may enable improved broadband performance (IBB), industrial control and communications (ICC), vehicular applications (V2X, V2V) and/or massive machine-type communications (mMTC).

Deployments of a 5G network may include stand-alone systems, and/or may include a phased approach, e.g., in combination with existing deployments and/or with existing technologies (e.g., such as LTE and/or an evolution thereof). Combinations with existing technologies may involve radio access network components and/or core network components. For initial deployments using a phased approach, it may be expected that 5G systems may be deployed under the umbrella of an existing LTE system. In this LTE-Assisted deployment scenario, an LTE network may provide basic cellular functions such as mobility to/from LTE, core network functions and so on. As commercial 5G deployments may become more available, it may be expected that the deployments may evolve such that the 5G systems become standalone, perhaps independent of LTE. This second phase of 5G may be expected to target new (e.g., heretofore undefined) use cases with perhaps stringent reliability and/or latency requirements.

SUMMARY

Functionality of a 5G protocol stack may be provided. The functions of the protocol stack may include one or more of: header compression, security, integrity protection, ciphering, segmentation, concatenation, (de-)multiplexing, automatic repeat request (ARQ), mapping to spectrum operating mode (SOM), modulation and/or coding, hybrid-ARQ (HARQ), and/or mapping to antenna/physical channels. A wireless transmit and receive device (WTRU) may be configured with a (e.g., single) HARQ entity and/or one or more, or multiple, SOMs. The WTRU may have a (e.g., single) HARQ buffer to manage for the HARQ signals received across the SOMs. The WTRU may be configured to transmit/receive traffic of various kinds over the SOMs. A WTRU may be configured with at least one HARQ entity for one or more, or each, SOM configured. The logical channels (LCH(s)) may be assigned to any of the SOMs.

Logical channel(s) may be multiplexed together based on latency requirements. Mapping of LCH(s) to SOM(s) may be based on SOM capability and/or LCH requirements. The WTRU may determine mapping based on pre-defined rules. The mapping may be based on the requirements for the various types of traffic and/or SOM capabilities. A radio bearer may be mapped to one or more SOMs. The WTRU may be configured with, perhaps for example for one or more, or each, radio bearer, a set of SOMs it may use. The WTRU may dynamically determine, perhaps for example based on radio conditions, buffer status and/or other parameters, the SOM to use. Incompatible multiplexing of LCH may be reduced and/or avoided based on using a (e.g., a single) transport block (TB) (e.g., limited by ratio of data), and/or one or more, or multiple, TBs mapped to the same physical layer (PHY). Traffic may be prioritized perhaps for example based on latency requirements.

A wireless transmit/receive unit (WTRU) may be in communication with a wireless communication network. The WTRU may comprise a memory. The WTRU may comprise a receiver. The receiver may be configured to receive a configuration. The configuration may include one or more characteristics for one or more transmission modes (TMs) of the WTRU. The WTRU may comprise a processor. The processor may be configured to select, dynamically, at least one TM of the one or more TMs for a transmission of an uplink data unit. The dynamic selection may be based on one or more data transfer requirements and/or the one or more TM characteristics. The processor may be configured to identify at least one transport channel associated with the at least one TM. The processor may be configured to map the uplink data unit to the at least one transport channel. The WTRU may comprise a transmitter. The transmitter may be configured at least to send the transmission of the uplink data unit to one or more devices of the wireless communication network.

DETAILED DESCRIPTION

A detailed description of illustrative embodiments will now be described with reference to the various figures. Although this description provides a detailed example of possible implementations, it should be noted that the details are intended to be examples and in no way limit the scope of the application.

Figure 1A:
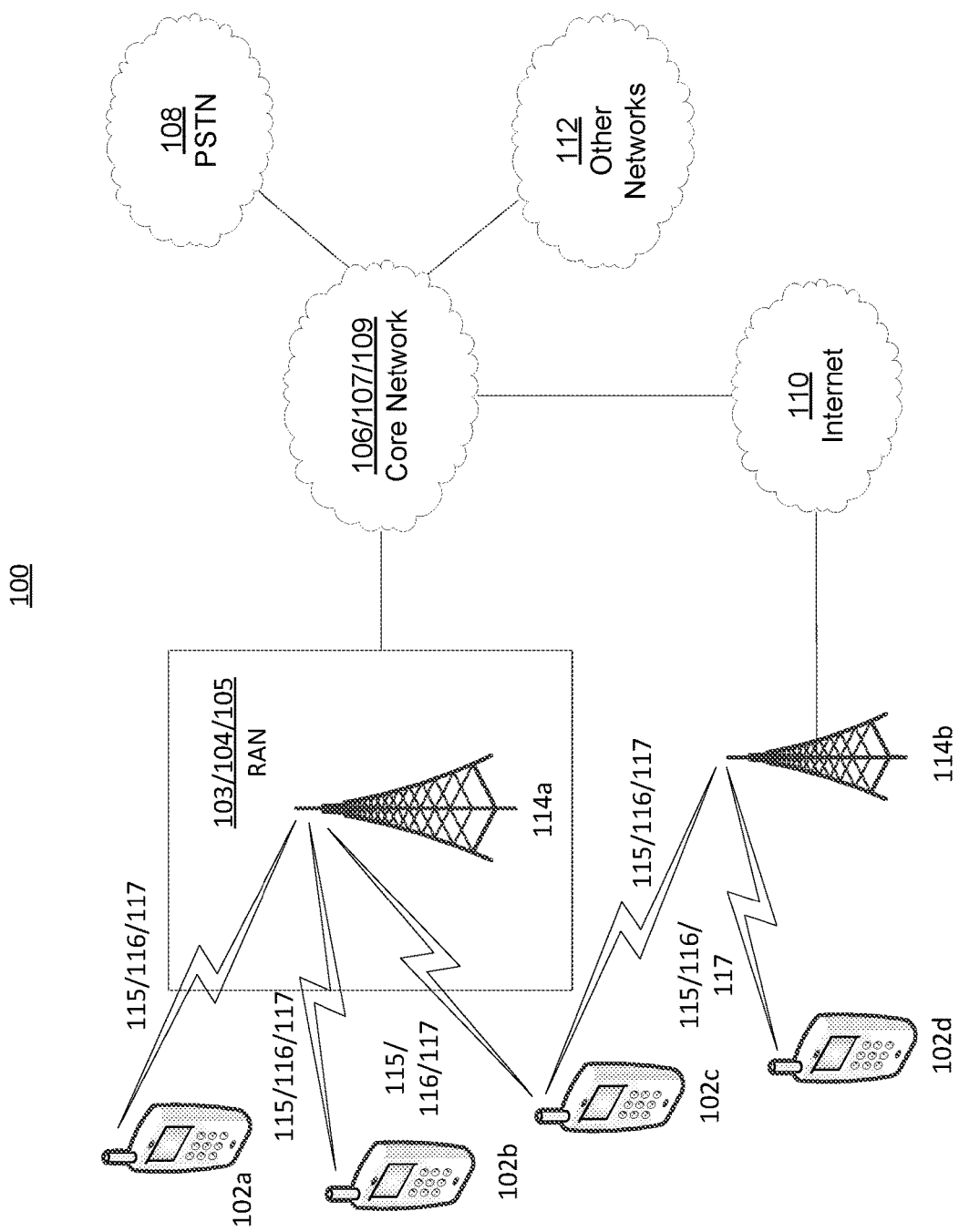
FIG. 1A is a system diagram of an example communications system.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and/or the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and/or the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and/or the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and/or the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1a may be configured to communicate with the base station 114a, which may employ a cellular-based radio technology, and with the base station 114b, which may employ an IEEE 802 radio technology.

Figure 1B:
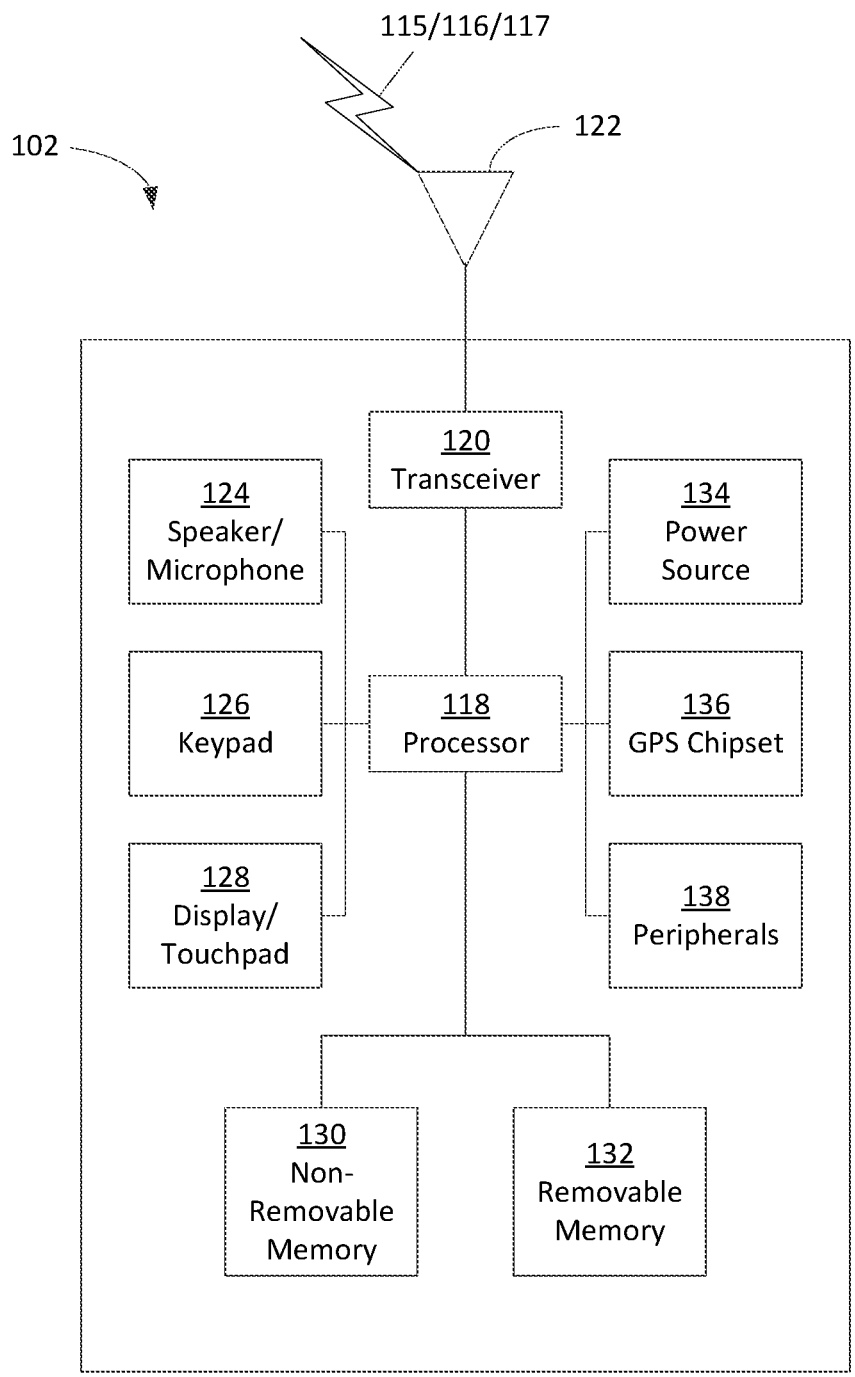
FIG. 1B is a system diagram of an example wireless transmit/receive unit (WTRU) that may be used within the communications system Illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and/or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive radio frequency (RF) signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and/or the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

Figure 1C:
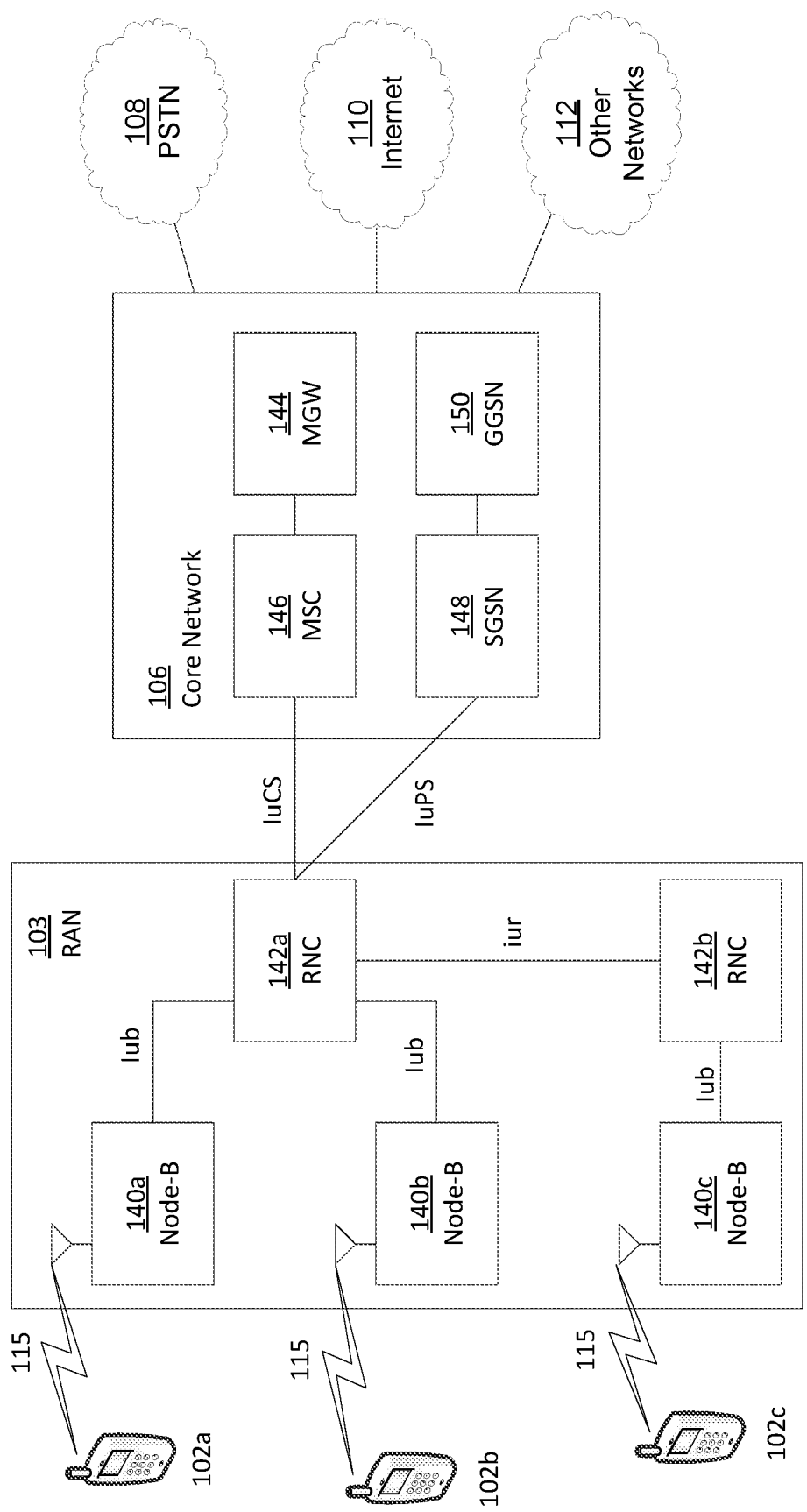
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and/or the like.

The core network 106 shown in FIG. 1C may include a media gateway (MGW) 144, a mobile switching center (MSC) 146, a serving general packet radio service (GPRS) support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
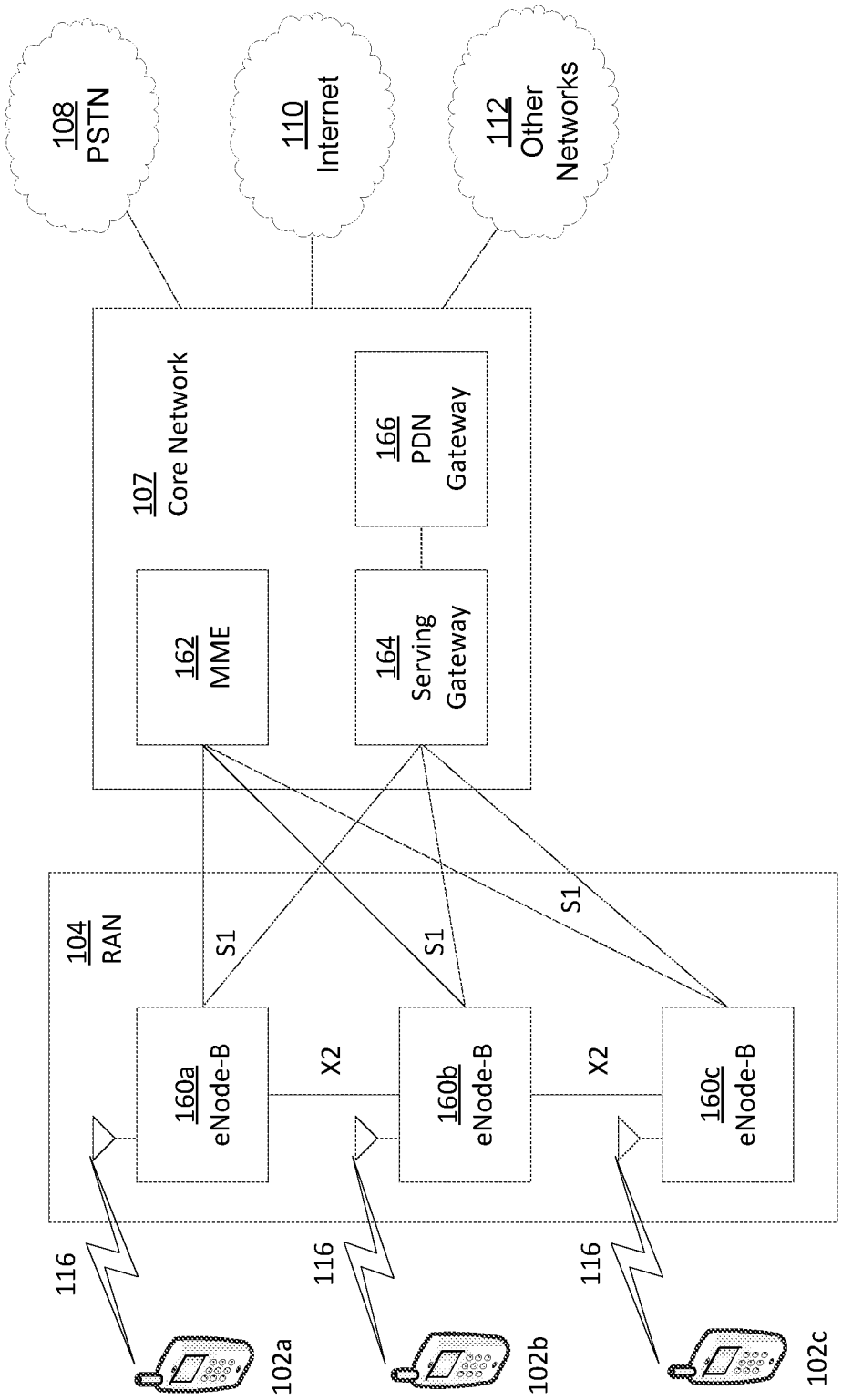
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and/or the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and/or the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and/or the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
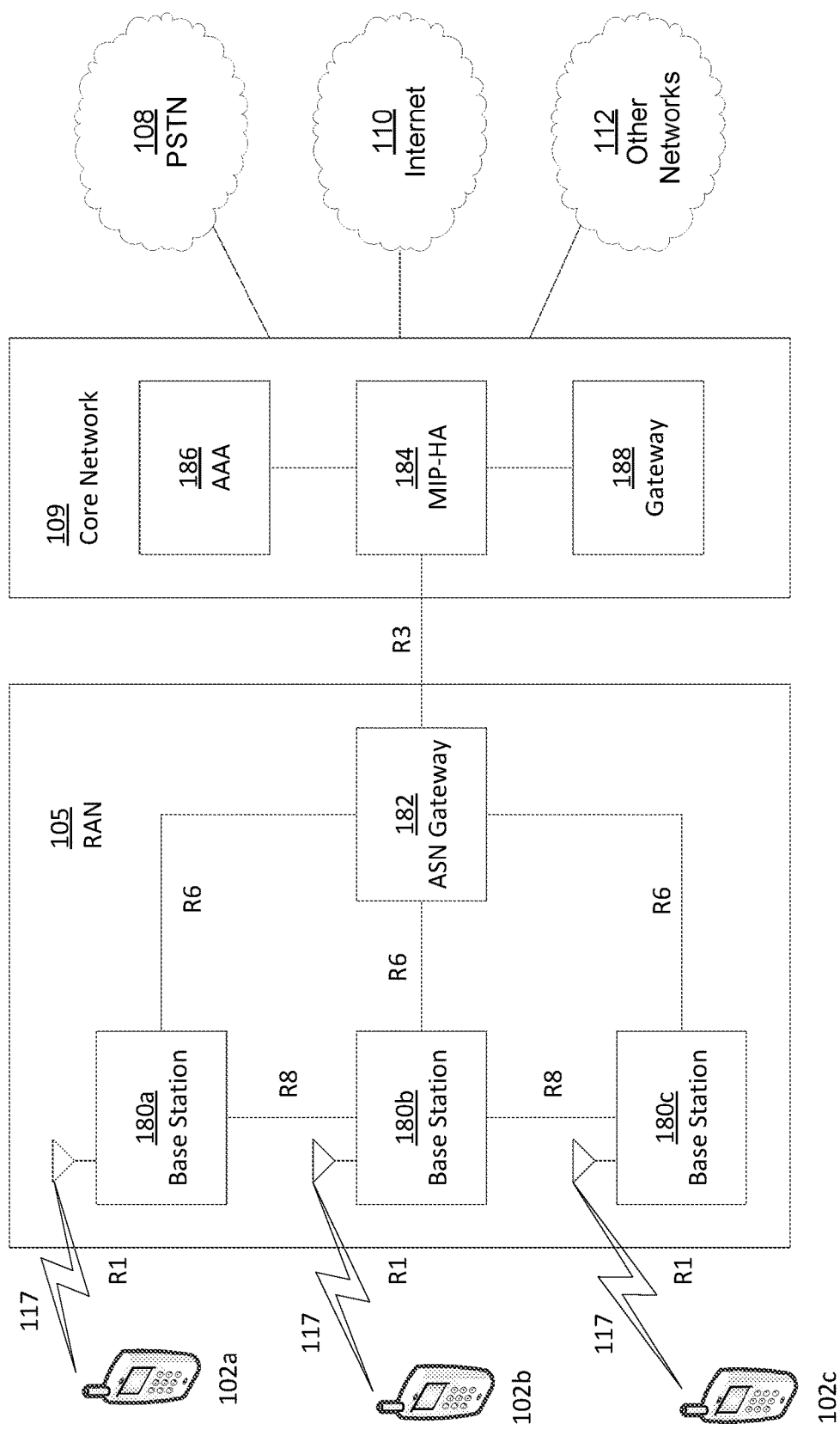
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and/or the like. The ASN gateway 182 may serve as a traffic aggregation point and may be responsible for paging, caching of subscriber profiles, routing to the core network 109, and/or the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In view of FIGS. 1A-1E, and the corresponding description of FIGS. 1A-1E, one or more, or all, of the functions described herein with regard to one or more of: WTRU 102a-d, Base Station 114a-b, Node B 140a-c, RNC 142a-b, MSC 146, SGSN 148, MGW 144, CGSN 150, eNode-B 160a-c, MME 162, Serving Gateway 164, PDN Gateway 166, Base Station 180a-c, ASN Gateway 182, AAA 186, MIP-HA 184, and/or Gateway 188, or the like, may be performed by one or more emulation devices (not shown)

(e.g., one or more devices configured to emulate one or more, or all, of the functions described herein).

The one or more emulation devices may be configured to perform the one or more, or all, functions in one or more modalities. For example, the one or more emulation devices may perform the one or more, or all, functions while being fully or partially implemented/deployed as part of a wired and/or wireless communication network. The one or more emulation devices may perform the one or more, or all, functions while being temporarily implemented/deployed as part of a wired and/or wireless communication network. The one or more emulation devices may perform the one or more, or all, functions while not being implemented/deployed as part of a wired and/or wireless communication network (e.g., such as in a testing scenario in a testing laboratory and/or a non-deployed (e.g. testing) wired and/or wireless communication network, and/or testing performed on one or more deployed components of a wired and/or wireless communication network). The one or more emulation devices may be test equipment.

By way of example, and not limitation, one or more of the following acronyms may be referenced herein:
Δf Sub-carrier spacing
5gFlex 5G Flexible Radio Access Technology
5gNB 5GFlex NodeB
ACK Acknowledgement
BLER Block Error Rate
BTI Basic TI (in integer multiple of one or more symbol duration)
CB Contention-Based (e.g., access, channel, resource)
CoMP Coordinated Multi-Point transmission/reception
CP Cyclic Prefix
CP-OFDM Conventional OFDM (relying on cyclic prefix)
CQI Channel Quality Indicator
CN Core Network (e.g., LTE packet core)
CRC Cyclic Redundancy Check
CSI Channel State Information
CSG Closed Subscriber Group
DC Dual Connectivity
D2D Device to Device transmissions (e.g., LTE Sidelink)
DCI Downlink Control Information
DL Downlink
DM-RS Demodulation Reference Signal
DRB Data Radio Bearer
EPC Evolved Packet Core
FBMC Filtered Band Multi-Carrier
By way of example, and not limitation, one or more of the following acronyms may be referenced herein:
FBMC/OQAM A FBMC technique using Offset Quadrature Amplitude Modulation
FDD Frequency Division Duplexing
FDM Frequency Division Multiplexing
HARQ Hybrid Automatic Repeat Request (ARQ)
ICC Industrial Control and Communications
ICIC Inter-Cell Interference Cancellation
IP Internet Protocol
LAA License Assisted Access
LBT Listen-Before-Talk
LCH Logical Channel
LCP Logical Channel Prioritization
LLC Low Latency Communications
LTE Long Term Evolution e.g., from 3GPP LTE R8 and up
MAC Medium Access Control
NACK Negative ACK
MBB Massive Broadband Communications
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
By way of example, and not limitation, one or more of the following acronyms may be referenced herein:
OOB Out-Of-Band (emissions)
$P_{cmax}$ Total available WTRU power in a given TI
PHY Physical Layer
PRACH Physical Random Access Channel
PDU Protocol Data Unit
PER Packet Error Rate
PL Path Loss (Estimation)
PLMN Public Land Mobile Network
PLR Packet Loss Rate
PSS Primary Synchronization Signal
QoS Quality of Service (from the physical layer perspective)
QCI QoS Class Identifier
RAB Radio Access Bearer
RACH Random Access Channel (or procedure)
RF Radio Front end
RNTI Radio Network Identifier
RRC Radio Resource Control
RRM Radio Resource Management
RS Reference Signal
RTT Round-Trip Time
By way of example, and not limitation, one or more of the following acronyms may be referenced herein:
SCMA Single Carrier Multiple Access
SDU Service Data Unit
SOM Spectrum Operation Mode
SS Synchronization Signal
SSS Secondary Synchronization Signal
SRB Signalling Radio Bearer
SWG Switching Gap (in a self-contained subframe)
TB Transport Block
TBS Transport Block Size
TDD Time-Division Duplexing
TDM Time-Division Multiplexing
TI Time Interval (in integer multiple of one or more BTI)
TTI Transmission Time Interval (in integer multiple of one or more TI)
TrCH Transport Channel
TRP Transmission/Reception Point
TRx Transceiver
UCI Uplink Control Information (e.g., HARQ feedback, CSI)
UFMC Universal Filtered MultiCarrier
UF-OFDM Universal Filtered OFDM
UL Uplink
URC Ultra-Reliable Communications
URLLC Ultra-Reliable and Low Latency Communications
V2V Vehicle to vehicle communications
V2X Vehicular communications
WLAN Wireless Local Area Networks and related technologies (IEEE 802.xx domain).

Figure 2:
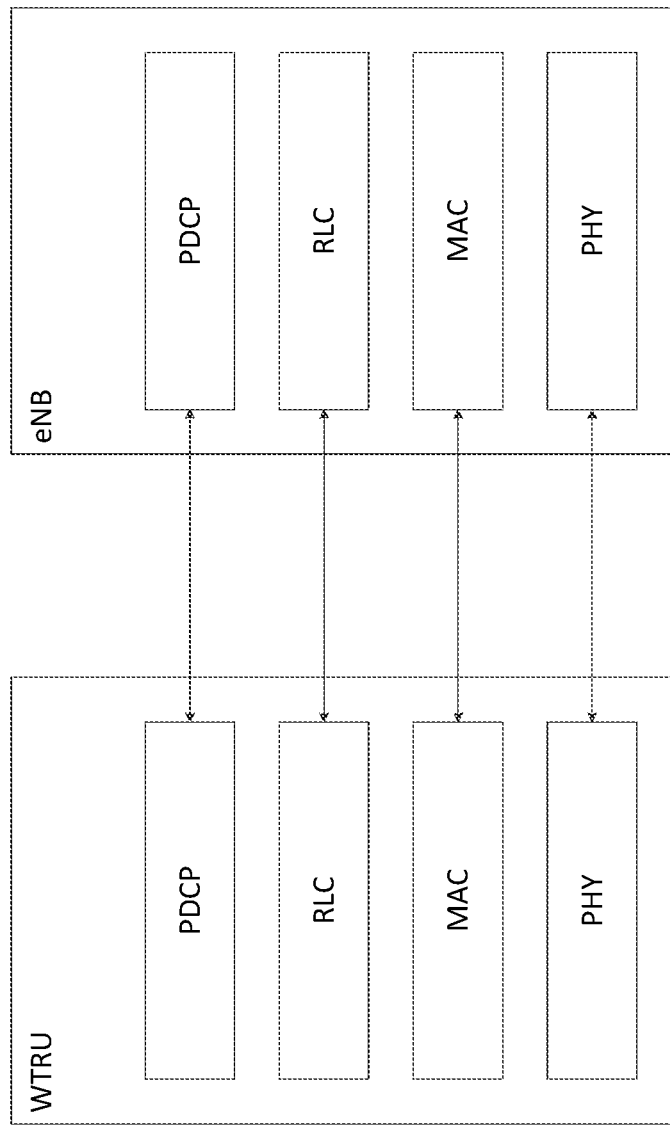
FIG. 2 illustrates an example LTE user-plane protocol stack.

FIG. 2 illustrates an example LTE user-plane protocol stack. The radio protocol architecture for the LTE user plane shown in FIG. 2 may include the PDCP, RLC MAC and/or physical layer (PHY) sublayers. One or more, or each, sublayer may be responsible for a subset of functions used to transfer data from the WTRU to the eNB (and for example, vice-versa) over the radio medium.

The MAC sublayer may offer a number of services and/or functions including, but not limited to: multiplexing/demultiplexing of MAC service data units (SDUs) belonging to one or more, or different, logical channels into/from transport blocks (TB) delivered to/from the physical layer on transport channels; scheduling information reporting; error correction through HARQ; priority handling between logical channels of at least one WTRU; priority handling between WTRUs by means of dynamic scheduling; MBMS service identification; transport format selection; and/or padding.

Figure 3:
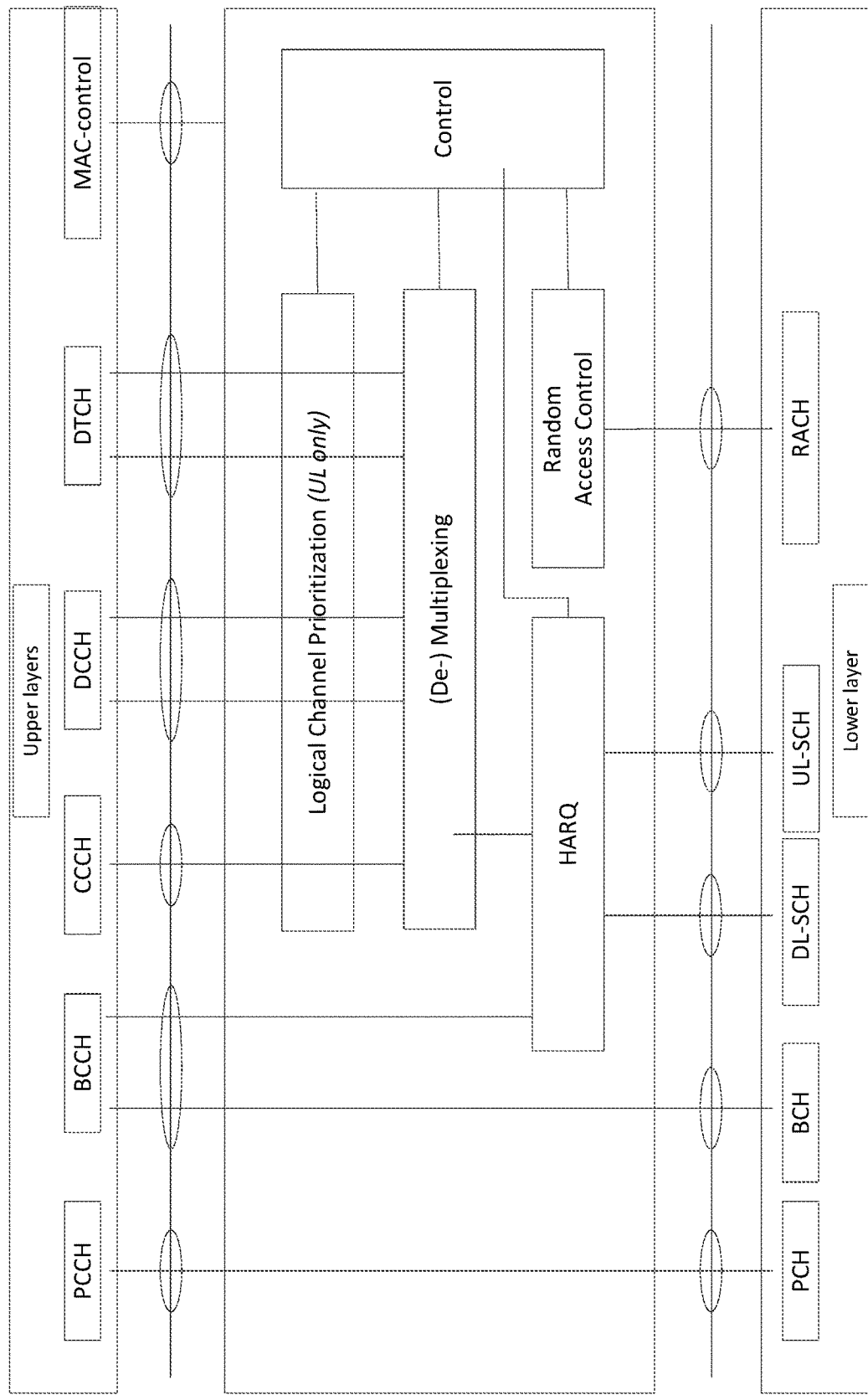
FIG. 3 illustrates an example LTE medium access control (MAC) architecture.

FIG. 3 illustrates an example LTE MAC architecture. As shown, the various functions may interact with each other. Logical channel prioritization (specified for the uplink) and/or multiplexing are functions that may be used to determine and/or select the set of data to transmit in a specific TTI (MAC protocol data unit (PDU)).

The Hybrid-ARQ (HARQ) functionality may control the fast retransmissions over the air. HARQ may rely on fast acknowledgement/negative acknowledgement (ACK/NACK) feedback provided by the physical layer in order to determine whether a retransmission may be useful, or not. Because of the inherent delay in LTE associated to providing the feedback (e.g., the receiver may decode and/or transmit the feedback), one or more, or multiple, concurrent HARQ processes may be used (e.g., up to 8 in LTE). One or more, or each, HARQ process may carry a different MAC PDU and/or may operate independently with respect to transmissions and/or retransmissions.

HARQ retransmissions on the LTE uplink may be synchronous. For example, there may be a fixed time relationship between transmissions and retransmissions of a given MAC PDU. On the LTE downlink HARQ operations may be asynchronous, and/or the HARQ process ID may be explicitly signaled on the downlink signaling grant. HARQ Ack/Nack may be sent by the WTRU with a fixed timing with respect to the associated transmission (e.g., 4 TTI after).

A 5G flexible air interface may be provided to enable improved broadband performance (IBB), industrial control and communications (ICC), vehicular applications (V2X) and/or massive machine-type communications (mMTC). The 5G flexible air interface may provide support for ultra-low transmission latency (LLC). Air interface latency may be as low as 1 ms round-trip time (RTT) and/or may provide support for TTIs somewhere between 100 us and 250 us. (perhaps for example, no larger than) 250 us. The 5G flexible air interface may provide support for ultra-low access latency (e.g., time from initial system access until the completion of the transmission of the first user plane data unit) is of interest but of lesser priority. The 5G flexible air interface may provide support for end-to-end (e2e) latency of less than 10 ms. The 5G flexible air interface may provide support for ultra-reliable transmission (URC). Target may be 99.999% transmission success and/or service availability.

The 5G flexible air interface may provide support for mobility for speed in the range of 0-500 km/h. At least IC and/or V2X may have packet loss ratio of less than 10e-6. Support for machine-type communications (MTC) operation (including narrowband operation) may be provided. The air interface may support narrowband operation (e.g., using less than 200 KHz), extended battery life (e.g., up to 15 years of autonomy) and/or minimal communication overhead for small and/or infrequent data transmissions e.g., low data rate in the range of 1-100 kbps with access latency of seconds to hours.

A flexible radio access system may be provided. OFDM is used as the basic signal format for data transmissions in LTE and/or in IEEE 802.11. OFDM may divide the spectrum into one or more, or multiple, parallel orthogonal subbands. One or more, or each, subcarrier is shaped using a rectangular window in the time domain leading to sinc-shaped subcarriers in the frequency domain. OFDMA may be associated with perfect frequency synchronization and/or tight management of uplink timing alignment within the duration of the cyclic prefix to maintain orthogonality between signals and/or to minimize intercarrier interference. Such tight synchronization might not be well-suited in a system where a WTRU is connected to multiple access points (e.g., simultaneously). Power reduction may be applied to uplink transmissions to compliant with spectral emission requirements to adjacent bands, in particular in the presence of aggregation of fragmented spectrum for the WTRU's transmissions.

Some of the shortcomings of conventional OFDM (CP-OFDM) can be addressed by more stringent RF requirements for implementations, and/or when operating using large amount of contiguous spectrum not requiring aggregation. A CP-based OFDM transmission scheme may lead to a downlink physical layer for 5G similar to that of legacy system e.g., mainly modifications to pilot signal density and/or location.

A number of principles applicable to the design of a flexible radio access for 5G are described herein. The descriptions herein are not meant to limit in any way the applicability of the methods described further herein to other wireless technologies and/or to wireless technology using different principles, when applicable.

The 5G Flexible Radio Access Technology (5gFLEX) downlink transmission scheme may be based on a multicarrier waveform characterized by high spectral containment (e.g., lower side lobes and/or lower Out-Of-Band (OOB) emissions). Multi-carrier (MC) waveform candidates for 5G may include, but not limited to, OFDM-OQAM (offset quadrature amplitude modulation) and/or universal filtered MultiCarrier (UFMC) (UF-OFDM).

Multicarrier modulation waveforms may divide the channel into subchannels and/or modulate data symbols on subcarriers in these subchannels. With OFDM-OQAM, a filter may be applied in the time domain per subcarrier to the OFDM signal to reduce OOB.

With UFMC (UF-OFDM), a filter may be applied in the time domain to the OFDM signal to reduce OOB. Filtering may be applied per subband to use spectrum fragments thereby reducing complexity and/or making UF-OFDM somewhat more practical to implement.

Methods described herein are however not limited to the waveforms described herein and/or may be applicable to other waveforms. The waveforms described herein will be further used for exemplary purposes.

Such waveforms may enable multiplexing in frequency of signals with non-orthogonal characteristics (e.g., such as different subcarrier spacing) and/or co-existence of asynchronous signals without requiring complex interference cancellation receivers. It may facilitate the aggregation of fragmented pieces of spectrum in the baseband processing as a lower cost alternative to its implementation as part of the RF processing.

Different waveforms may coexist within the same band. The mMTC narrowband operation may be supported, for example, using single carrier multiple access (SCMA). The combination of different waveforms e.g., CP-OFDM, OFDM-OQAM and/or UF-OFDM within the same band may be supported for all aspects and/or for downlink and/or uplink transmissions. Such co-existence may include transmissions using different types of waveforms between different WTRUs and/or transmissions from the same WTRU, e.g., simultaneously, with some overlap and/or consecutive in the time domain.

Hybrid types of waveforms may be supported. For example, waveforms and/or transmissions may support at least one of: a possibly varying cyclic prefix (CP) duration (e.g., from one transmission to another), a combination of a CP and a low power tail (e.g., a zero tail), a form of hybrid guard interval (e.g., using a low power CP and an adaptive low power tail) and/or the like. Such waveforms may support dynamic variation and/or control of further aspects such as how to apply filtering (e.g., whether filtering is applied at the edge of the spectrum used for reception of any transmission(s) for a given carrier frequency, and/or at the edge of a spectrum used for reception of a transmission associated to a specific SOM, and/or per subband, and/or per group thereof).

The uplink transmissions may use a same or different waveform as for downlink transmissions. Multiplexing of transmissions to and from different WTRUs in the same cell may be based on FDMA and/or TDMA.

The 5gFLEX radio access system may be characterized by a very high degree of spectrum flexibility that enables deployment in different frequency bands with different characteristics, including different duplex arrangements, different and/or variable sizes of the available spectrum including contiguous and/or non-contiguous spectrum allocations in the same or different bands. It may support variable timing aspects including support for one or more, or multiple, TTI lengths and/or support for asynchronous transmissions.

The 5gFLEX radio access system may provide flexibility in duplexing arrangement. TDD and/or FDD duplexing schemes can be supported. For FDD operation, supplemental downlink operation may be supported using spectrum aggregation. FDD operation may support full-duplex FDD and/or half-duplex FDD operation. For TDD operation, the downlink (DL)/uplink (UL) allocation may be dynamic. DL/UL allocation might not be based on a fixed DL/UL frame configuration. The length of a DL and/or a UL transmission interval may be set per transmission opportunity.

The 5gFLEX radio access system may provide bandwidth flexibility, e.g., to enable the possibility for different transmission bandwidths on uplink and/or downlink ranging from anything between a nominal system bandwidth up to a maximum value corresponding to the system bandwidth.

For single carrier operation, supported system bandwidths may, for example, include 5, 10, 20, 40, and/or 80 MHz and/or the like. Possibly, supported system bandwidths could be any bandwidth in a given range e.g., from a few MHz up to 160 MHz. Nominal bandwidths could possibly have one or more fixed possible values. Narrowband transmissions of up to 200 KHz could be supported within the operating bandwidth for MTC devices.

Figure 4:
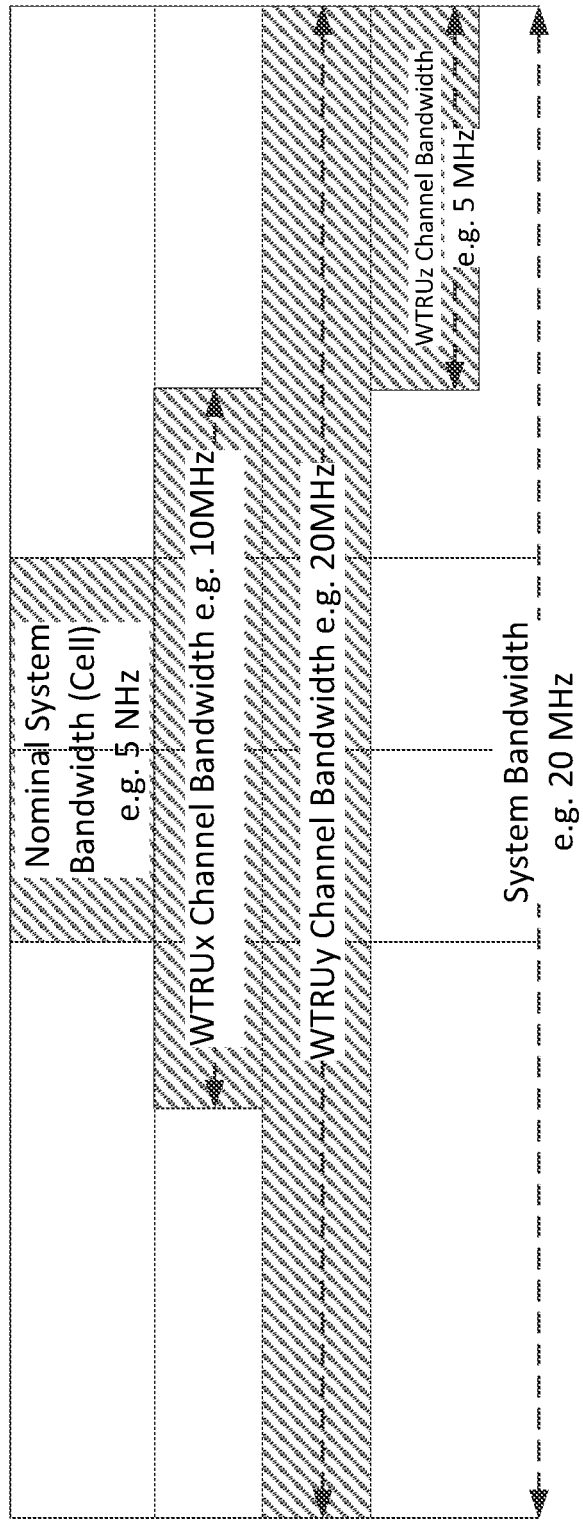
FIG. 4 illustrates example system bandwidths.

System bandwidth, as used herein, may include the largest portion of spectrum that can be managed by the network for a given carrier. For such a carrier, the portion that a WTRU minimally supports for cell acquisition, measurements and/or initial access to the network may correspond to the nominal system bandwidth. The WTRU may be configured with a channel bandwidth that is within the range of the entire system bandwidth. FIG. 4 illustrates example system bandwidths. The WTRU's configured channel bandwidth may or might not include the nominal part of the system bandwidth as shown FIG. 4.

Bandwidth flexibility can be achieved because the applicable set of RF requirements for a given maximum operating bandwidth in a band can be met without the introduction of additional allowed channel bandwidths for that operating band due to the efficient support of baseband filtering of the frequency domain waveform.

Methods to configure, reconfigure and/or dynamically change the WTRU's channel bandwidth for single carrier operation are contemplated, as well as methods to allocate spectrum for narrowband transmissions within the nominal system, system and/or configured channel bandwidth.

The physical layer of a 5G air interface may be band-agnostic and/or may support operation in licensed bands below 5 GHz as well as operation in the unlicensed bands in the range 5-6 GHz. For operation in the unlicensed bands, listen-before-talk (LBT) Cat 4 based channel access framework similar to LTE license assisted access (LAA) may be supported.

Methods to scale and/or manage (e.g., scheduling, addressing of resources, broadcasted signals, measurements) cell-specific and/or WTRU-specific channel bandwidths for arbitrary spectrum block sizes are contemplated.

The 5gFLEX radio access system may provide flexible spectrum allocation. Downlink control channels and/or signals support FDM operation. A WTRU can acquire a downlink carrier by receiving transmissions using the nominal part of the system bandwidth. For example, the WTRU might not initially be required to receive transmissions covering the entire bandwidth that is being managed by the network for the concerned carrier.

Downlink data channels can be allocated over a bandwidth that may or might not correspond to the nominal system bandwidth, without restrictions other than being within the WTRU's configured channel bandwidth. For example, the network may operate a carrier with a 12 MHz system bandwidth using a 5 MHz nominal bandwidth allowing devices supporting at most 5 MHz maximum RF bandwidth to acquire and/or access the system while possibly allocating +10 to −10 MHz of the carrier frequency to other WTRU's supporting up to 20 MHz worth of channel bandwidth.

Figure 5:
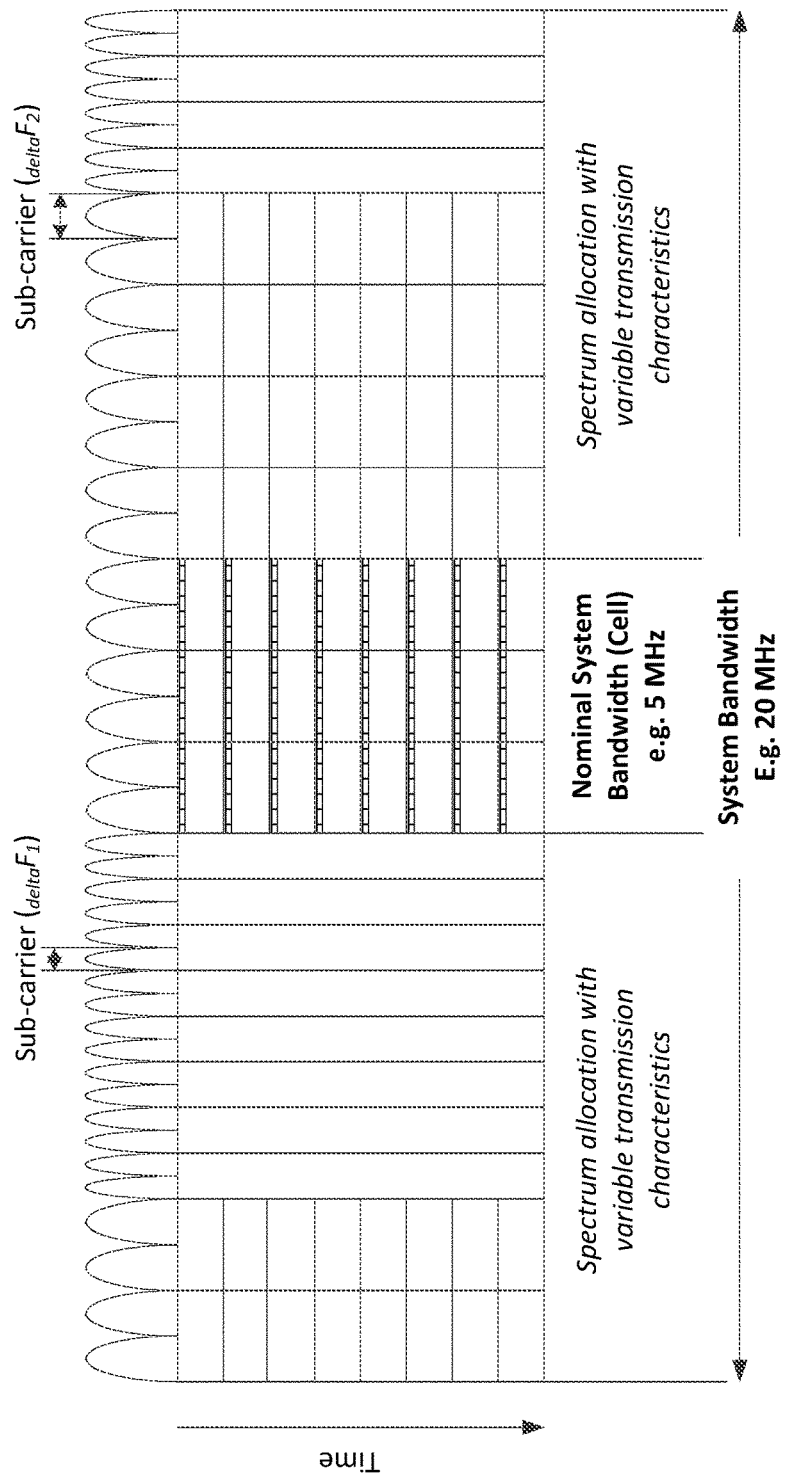
FIG. 5 illustrates example spectrum allocation where different subcarriers may be at least conceptually assigned to different modes of operation ("SOM").

FIG. 5 illustrates example spectrum allocation where different subcarriers may be at least conceptually assigned to different modes of operation (Spectrum Operating Modes (SOMs). Different SOMs can be used to fulfill different requirements for different transmissions. A SOM may include at least one of a subcarrier spacing, a TTI length, and one or more reliability aspects e.g., HARQ processing aspects, and/or a secondary control channel. A SOM may include a specific waveform and/or may include a processing aspect e.g., in support of co-existence of different waveforms in the same carrier using FDM and/or TDM. Coexistence of FDD operation in a TDD band may be supported e.g., in a TDM manner and/or similar.

The WTRU may be configured to perform transmissions according to one or more SOMs. For example, a SOM may correspond to transmissions that may use at least one of the following: a specific TTI duration, a specific initial power level, a specific HARQ processing type, a specific upper bound for successful HARQ reception/transmission, a specific configuration of set(s) of resources (e.g., network managed) for WTRU operation, a specific physical channel (uplink and/or downlink), a specific operating frequency, band and/or carrier, and/or a specific waveform type and/or a transmission according to a specific RAT (e.g., legacy LTE and/or according to a 5G transmission method). A SOM may correspond to one or more of: a QoS level and/or related aspect e.g., maximum/target latency, maximum/target block error rate (BLER), and/or the like.

A SOM may correspond to a spectrum area and/or to a specific control channel and/or aspect thereof (e.g., including search space, and/or downlink control information (DCI) type, etc.). For example, a WTRU may be configured with a SOM for one or more, or each, of a URC type of service, a LLC type of service, and/or a MBB type of service. A WTRU may have a configuration for a SOM for system access and/or for transmission/reception of L3 control signaling (e.g., radio resource control (RRC) signaling), e.g., in a portion of a spectrum associated to the system such as in a nominal system bandwidth as described herein.

As described herein, a SOM may be a characterization of a block of physical resources in time, space, and/or frequency. A SOM may include applicable set(s) of operations. A Transmission Mode (TM) may correspond to an instance (e.g., a specific instance) of a SOM characterization, perhaps for example in terms of a specific configuration. For example, a specific configuration may include one or more of: an applicable TTI duration, set of physical resource blocks, type of waveform, etc.). A Transmission Mode (TM) may also correspond to control signaling. For example, a TM may be referred to by downlink control signaling on a control channel. A transmission mode (TM) may correspond to a configuration of the WTRU such that the WTRU may determine one or more parameters applicable for the processing of the transmission (UL or DL), perhaps for example when the WTRU receives an assignment of one or more resources. A configuration of a TM (e.g., an applicable TM) may indicate to the WTRU how to receive WTRU-specific reference signals, how to interpret downlink control signaling received on PDCCH, and/or how to interpret precoding bits, and the like.

For single carrier operation, spectrum aggregation may be supported whereby the WTRU may support transmission and/or reception of one or more, or multiple, transport blocks over contiguous and/or non-contiguous sets physical resource blocks (PRBs) within the same operating band. A (e.g., a single) transport block may be mapped to separate sets of PRBs. Support for simultaneous transmissions associated to different SOM requirements may be provided.

Multicarrier operation may be supported using contiguous and/or non-contiguous spectrum blocks within the same operating band and/or across two or more operating bands. Aggregation of spectrum blocks using different modes, e.g., FDD and/or TDD and/or using different channel access methods (e.g., licensed and/or unlicensed band operation below 6 GHz) may be supported. Support for methods that configure, reconfigure and/or dynamically change the WTRU's multicarrier aggregation may be provided.

Flexible framing, timing and/or synchronization may be supported. Downlink and/or uplink transmissions may be organized into radio frames characterized by a number of fixed aspects (e.g., location of downlink control information) and/or a number of varying aspects (e.g., transmission timing, supported types of transmissions).

The basic time interval (BTI) may be expressed in terms of an integer number of one or more symbol(s), and/or symbol duration that may be a function of the subcarrier spacing applicable to the time-frequency resource. For FDD, subcarrier spacing may differ between the uplink carrier frequency $f_{UL}$ and the downlink carrier frequency $f_{DL}$ for a given frame.

A transmission time interval (TTI) may be the minimum time supported by the system between consecutive transmissions. Consecutive transmissions may be associated with different transport blocks (TBs) for the downlink ($TTI_{DL}$), for the uplink transceiver (UL TRx) perhaps for example excluding any preamble (e.g., if applicable) and/or perhaps including any control information (e.g., DCI for downlink and/or uplink control information (UCI) for uplink). A TTI may be expressed in terms of integer number of one of more BTI(s). A BTI may be specific and/or associated with a given SOM.

Supported frame duration may include, but not limited to, 100 us, 125 us (⅛ ms), 142.85 us (1/7 ms is 2 nCP LTE OFDM symbols) and 1 ms to enable alignment with the legacy LTE timing structure.

A frame may start with downlink control information (DCI) of a fixed time duration $t_{dci}$ preceding any downlink data transmission (DL TRx) for the concerned carrier frequency—$f_{UL}$+DL for TDD and $f_{DL}$ for FDD. For TDD duplexing (e.g., only TDD duplexing), a frame may include a downlink portion (DCI and/or DL TRx) and/or an uplink portion (UL TRx). A switching gap (swg) may precede the uplink portion of the frame, if present.

For FDD duplexing (e.g., only FDD duplexing), a frame may include a downlink reference TTI and/or one or more TTI(s) for the uplink. The start of an uplink TTI may be derived using an offset ($t_{offset}$) applied from the start of the downlink reference frame that may overlap with the start of the uplink frame.

For TDD, 5gFLEX may support Device to Device transmissions (D2D)/Vehicular communications (V2X)/Sidelink operation in the frame by including respective downlink control and/or forward direction transmission in the DCI+DL TRx portion (e.g., if a semi-static allocation of the respective resources is used) and/or in the DL TRx portion (e.g., only such portion) (e.g., for dynamic allocation) and/or by including the respective reverse direction transmission in the UL TRx portion.

For FDD, 5gFLEX may support D2D/V2X/Sidelink operation in the UL TRx portion of the frame by including respective downlink control, forward direction and/or reverse direction transmissions in the UL TRx portion (e.g., dynamic allocation of the respective resources may be used).

Figure 6:
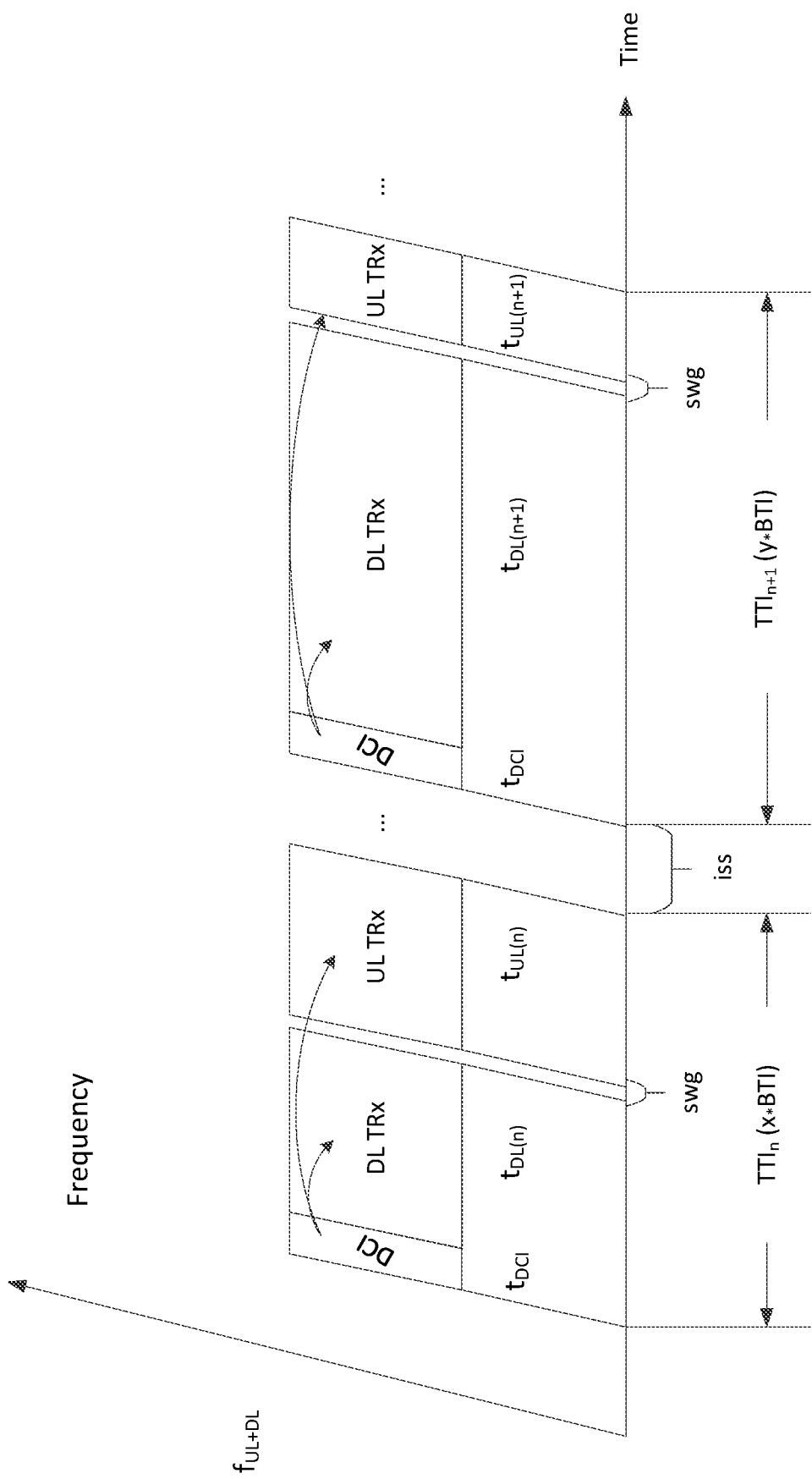
FIG. 6 illustrates example timing relationships for time-division duplexing (TDD).
Figure 7:
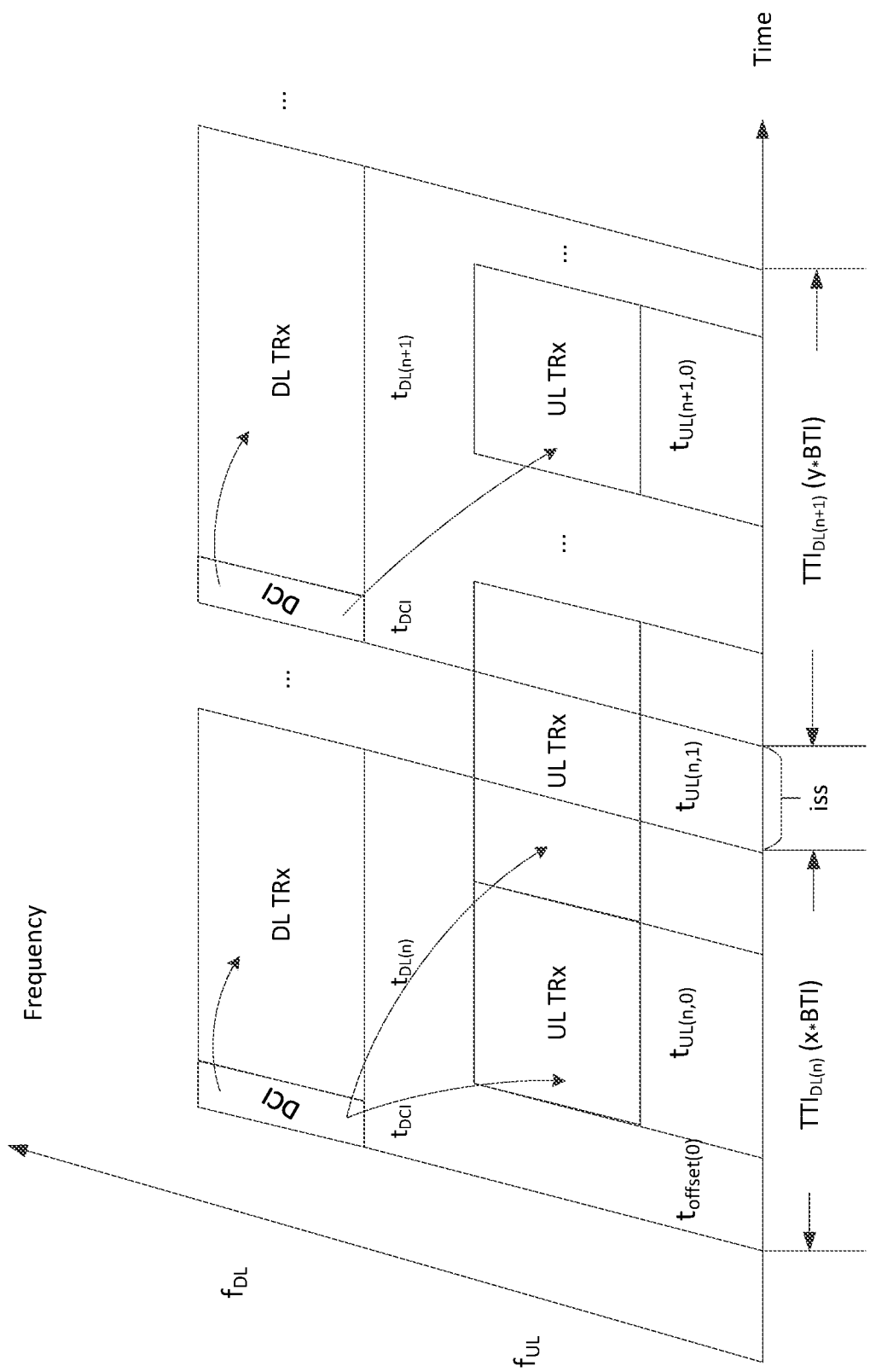
FIG. 7 illustrates example timing relationships for frequency division duplexing (FDD).

FIG. 6 illustrates example frame structure and/or frame timing relationships for TDD duplexing. FIG. 7 illustrates example frame structure and/or frame timing relationships for FDD duplexing.

A WTRU may receive downlink control information (DCI) from at least one device of one or more devices of a wireless communication network. The WTRU may identify a resource allocation indicated by the DCI for transmission of an uplink data unit. The WTRU may determine a Quality of Service (QoS) requirement for the transmission of the uplink data unit. The WTRU may determine if the resource allocation indicated by the DCI for transmission of the uplink data unit at least satisfies, or fails to satisfy, the QoS requirement. The WTRU may determine to not utilize the resource allocation indicated by the DCI for the transmission of the uplink data unit, perhaps for example when the resource allocation indicated by the DCI fails to satisfy (e.g., is determined to fail to satisfy) the QoS requirement.

The WTRU may identify a resource allocation corresponding to the at least one TM of the one or more TMs for the transmission of the uplink data unit. The WTRU may determine to utilize the resource allocation corresponding to the at least one TM of the one or more TMs for the transmission of the uplink data unit (e.g., in lieu of the resource allocation indicated by the DCI for transmission of the uplink data unit), perhaps for example when the resource allocation provided by the DCI fails to satisfy (e.g., is determined to fail to satisfy) the QoS requirement.

A scheduling function may be supported in the MAC layer. A scheduling mode may be selected. The available scheduling modes may include network-based scheduling for tight scheduling in terms of resources, timing and/or transmission parameters of downlink transmissions and/or uplink transmissions, and/or WTRU-based scheduling for more flexibility in terms of timing and/or transmission parameters. Scheduling information may be valid for a single and/or for one or more, or multiple, TTIs.

Network-based scheduling may enable the network to tightly manage the available radio resources assigned to different WTRUs such as to optimize the sharing of such resources. Dynamic scheduling may be supported.

WTRU-based scheduling may enable the WTRU to opportunistically access uplink resources with minimal latency on a per-need basis within a set of shared and/or dedicated uplink resources assigned (e.g., dynamically and/or not) by the network. Synchronized and/or unsynchronized opportunistic transmissions may be supported. Contention-based transmissions and/or contention-free transmissions may be supported.

Logical channel prioritization may be performed based on data available for transmission and/or available resources for uplink transmissions. Multiplexing of data with different QoS requirements within the same transport block may be provided.

Forward error correction (FEC) and/or block coding be performed. A transmission may be encoded using a number of different encoding methods. Different encoding methods may have different characteristics. For example, an encoding method may generate a sequence of information units. One or more, or each, information unit, and/or block, may be self-contained. For example, an error in the transmission of a first block might not impair the ability of the receiver to successfully decode a second block, in particular if the second block is error-free and/or if sufficient redundancy can be found in the second block and/or in a different block for which at least a portion was successfully decoded.

Example of encoding methods may include raptor/fountain codes whereby a transmission may include a sequence of N raptor codes. One or more such codes may be mapped to one or more transmission "symbols" in time. A "symbol" may correspond to one or more set of information bits, e.g., one or more octets. Such encoding may be used to add FEC to a transmission whereby the transmission could use N+1 and/or N+2 raptor codes (and/or symbols, perhaps for example assuming a one raptor code symbol relationship). This may make the transmission more resilient to the loss of one "symbol", for example due to interference and/or puncturing by another transmission overlapping in time.

The WTRU may receive and/or detect one or more system signature. A system signature may include a signal structure using a sequence. Such signal may be similar to a synchronization signal e.g., similar to LTE primary synchronization signal (PSS) and/or secondary synchronization signal (SSS). Such signature may be specific (e.g., uniquely identify) to a particular node (and/or transmission/reception point (TRP)) within a given area or it may be common to a plurality of such nodes (and/or TRPs) within an area. Such aspect(s) might not be known and/or relevant to the WTRU. The WTRU may determine and/or detect a system signature sequence and/or further determine one or more parameters associated to the system. For example, the WTRU may derive an index therefrom, and/or may use such index to retrieve associated parameters e.g., within a table such as the access table described below. For example, the WTRU may use the received power associated with the signature for open-loop power control e.g., for the purpose of setting the initial transmission power if the WTRU determines that it may access (and/or transmit to) using applicable resources of the system. For example, the WTRU may use the timing of the received signature sequence e.g., for the purpose of setting the timing of a transmission (e.g., a preamble on a physical random access channel (PRACH) resource) if the WTRU determines that it may access (and/or transmit) using applicable of the system.

The WTRU may be configured with a list of one or more entries. Such a list may be referred to as an access table. Such a list may be indexed. One or more, or each, entry may be associated to a system signature and/or to a sequence thereof. Such access table may provide initial access parameters for one or more areas. One or more, or each, such entry may provide one or more parameters that may be useful for performing an initial access to the system. Such parameters may include at least one of a set of one or more random access parameters (e.g., including applicable physical layer resources (e.g., PRACH resources) in time and/or frequency), initial power level, and/or physical layer resources for reception of a response. Such parameters may include access restrictions, for example including public land mobile network (PLMN) identity and/or closed subscriber group (CSG) information. Such parameters may include routing-related information such as the applicable routing area(s). One or more, or each, such entry may be associated with, and/or indexed by, a system signature. In other words, one such entry may possibly be common to a plurality of nodes (and/or TRPs). The WTRU may receive such access table by means of a transmission using dedicated resources e.g., by RRC configuration and/or by means of a transmission using broadcasted resources. In the latter case, the periodicity of the transmission of an access table may be relatively long (e.g., up to 10240 ms) e.g., it may be longer than the periodicity of the transmission of a signature (e.g., in the range of 100 ms).

Figure 8:
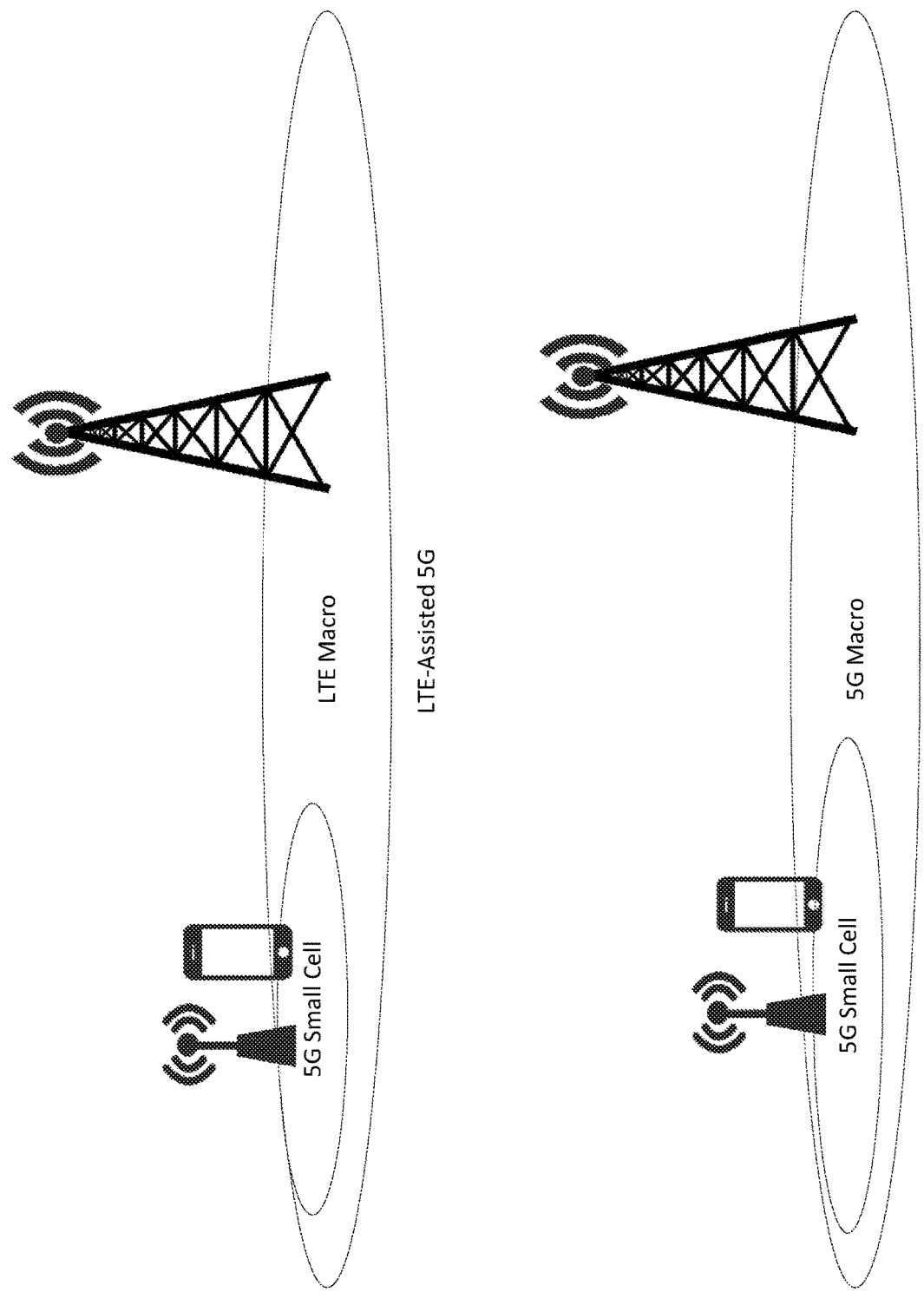
FIG. 8 illustrates example LTE-assisted and/or unassisted deployments.

FIG. 8 illustrates example LTE-assisted and/or unassisted deployments. For initial deployments using a phased approach, 5G systems may be deployed under the umbrella of an existing LTE system. In this LTE-Assisted deployment scenario, an LTE network may provide basic cellular functions such as mobility to/from LTE, core network functions and so on. The deployments may evolve such that the 5G systems may become standalone, independent of LTE, e.g., unassisted.

A protocol architecture and/or associated functions for a 5gFLEX system may be implemented. Although described in the context of a 5G RAT, the solutions described may also be applicable to the evolution of other RATs, such as LTE and/or Wi-Fi.

A stand-alone 5gFLEX radio access network may be provided. For example, the stand-alone 5gFLEX radio access network might not be assisted by an LTE network. Although solutions based on a standalone 5G deployment architecture are described here, the solution provided here may also be applicable to the LTE-Assisted architecture.

Figure 9:
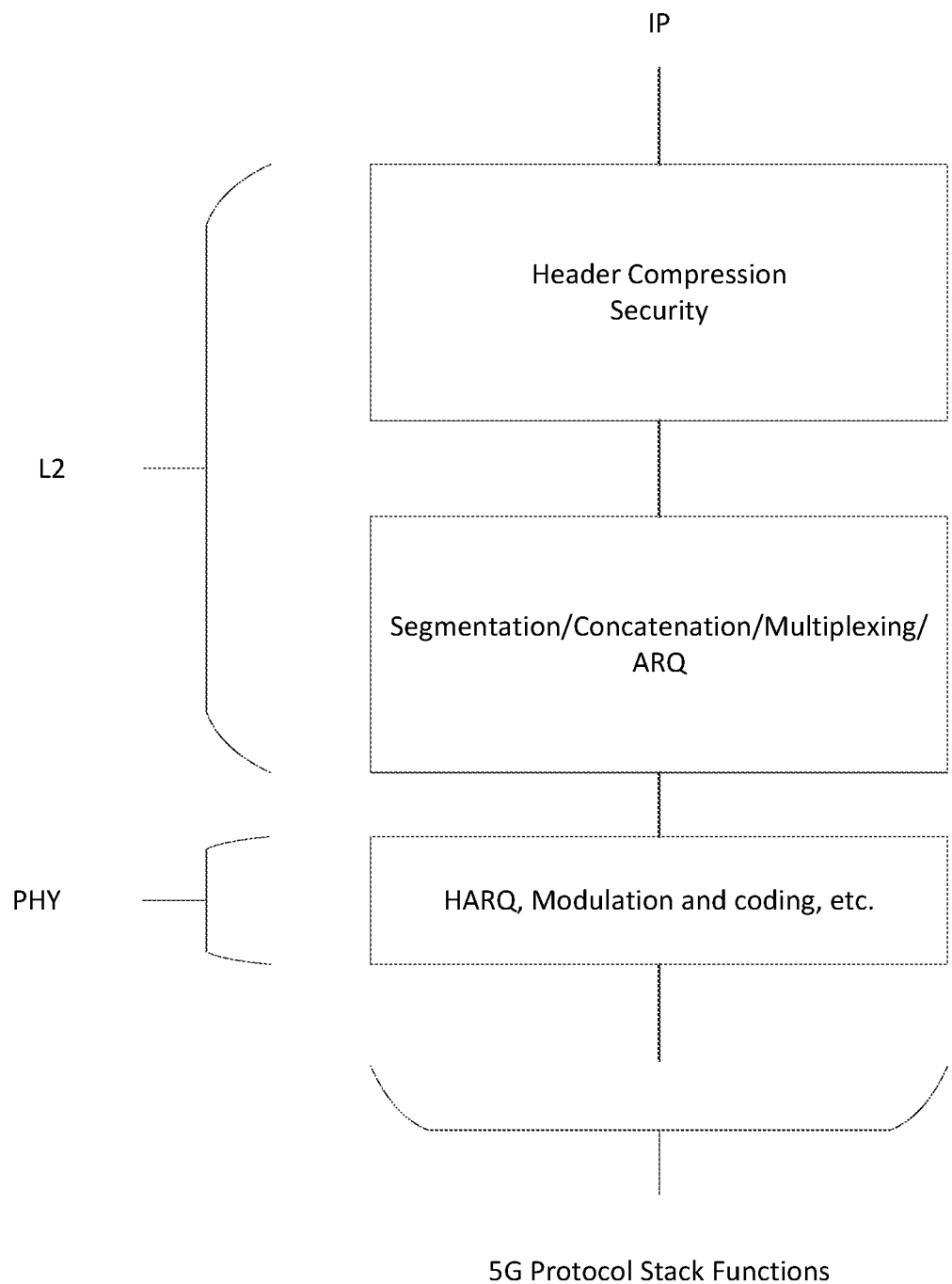
FIG. 9 illustrates example functionality of the 5G Protocol Stack at a high level.

The 5G protocol stack may offer a transport service of IP packets from a source node to a destination node over a wireless medium. FIG. 9 illustrates example functionality of the 5G Protocol Stack at a high level. The functions of the protocol stack may include one or more of, depending on the implementation and/or configuration, header compression, security, integrity protection, ciphering, segmentation, concatenation, multiplexing, ARQ, mapping to spectrum operating mode (SOM), modulation and/or coding, HARQ, and/or mapping to antenna/physical channels.

A logical channel (LCH) may represent a logical association between data packets and/or PDUs. LCH may have a different and/or broader meaning than a similar term for previous generations, such as LTE systems. For example, a logical association may be based on data units being associated with the same bearer and/or being associated with the same SOM and/or slice (e.g., a processing path using a set of physical resources). For example, an association may be characterized by one or more of: a chaining of processing functions, an applicable physical data (and/or control) channel (and/or instance thereof), and/or an instantiation of a protocol stack, which may include one or more of: a portion being centralized, such as PDCP (e.g., only PDCP) and/or anything beyond portions of the physical layer processing (e.g., Radio Front (RF) end, and/or another portion being closer to the edge (e.g., MAC/PHY in the TRP and/or RF only), which may be separated by a front hauling interface.

A logical channel group (LCG) may include a group of LCH(s) and/or equivalent (e.g., as described above). LCG may have a different and/or broader meaning than a similar term for previous generations, such as LTE systems. A grouping may be based on one or more criteria. For example, criteria may be that one or more LCH(s) have a similar priority level that is applicable to (and/or associated with) one or more of: one or more, or all, LCHs of the same LCG (similar to legacy), the same SOM (and/or type thereof), and/or the same slice (and/or type thereof). For example, an association may characterized by one or more of: a chaining of processing functions, an applicable physical data (and/or control) channel (and/or instance thereof), and/or an instantiation of a protocol stack, which may include a specific portion being centralized (e.g., PDCP only and/or anything except RF) and/or another portion being closer to the edge (e.g., MAC/PHY in the TRP, and/or RF only), which may be separated by a front-hauling interface.

A transport channel (TrCH) may include a (e.g., specific) set of processing steps and/or a set of functions applied to data information that may affect one or more transmission characteristics over a radio interface.

TrCH may be defined (e.g., for LTE) with one or more, or multiple, types of TrCH, such as the Broadcast Channel (BCH), the Paging Channel (PCH), the Downlink Shared Channel (DL-SCH), the Multicast Channel (MCH), the Uplink Shared Channel (UL-SCH) and/or the Random Access Channel, which may or might not carry user plane data. Main transport channels for carrying user plane data may be the DL-SCH and/or the UL-SCH, e.g., for the downlink and/or uplink, respectively.

TrCH may include an augmented set of requirements supported by the air interface and/or support for one or more, or multiple, transport channels (e.g., for user and/or control plane data) for one or more WTRU devices. TrCH may have a different and/or broader meaning than a similar term for previous generations, such as LTE systems. For example, a transport channel for URLLC (e.g., URLLCH), for mobile broadband (MBBCH) and/or for machine type communications (MTCCH) may be defined for downlink transmission (e.g., DL-URLLCH, DL-MBBCH and/or DL-MTCCH) and/or for uplink transmissions (e.g., UL-URLLCH, UL-MBBCH and/or UL-MTCCH).

For example, one or more, or multiple, TrCHs may be mapped to a different set of physical resources (e.g., PhCH) belonging to the same SOM. This mapping may be advantageous, for example, to support simultaneous transmission of traffic with different requirements over the same SOM. For example, a URLLCH may be transmitted along MTCCH simultaneously, for example, when a WTRU may be configured with a SOM (e.g., a single SOM).

A WTRU may be configured with one or more parameters associated with a characterization of how data may be transmitted. A characterization may represent constraints and/or requirements that a WTRU may be expected to meet and/or enforce. A WTRU may perform different operations and/or adjust its behavior as a function of the state associated with data based on a characterization. Parameters may include, for example, time-related aspects (e.g., such as Time to Live (TTL) for a packet (e.g., on a per-packet basis), which may represent the time before which the packet can be transmitted to meet, and/or acknowledge, etc. to meet latency requirements), rate-related aspects and/or configuration related aspects (e.g., absolute priority). Parameters may be changed with time, for example while the packet and/or data may be pending for transmission.

A number of protocol architectures may support the functions listed. For example, HARQ retransmissions may be handled. One or more SOM may be selected to perform retransmissions. A SOM may include a different carrier in the same and/or different band, a different RAT, and/or a different mode of 5G PHY. Further, the term logical channel (LCH) in the following might not be associated to a traditional logical channel.

Figure 10:
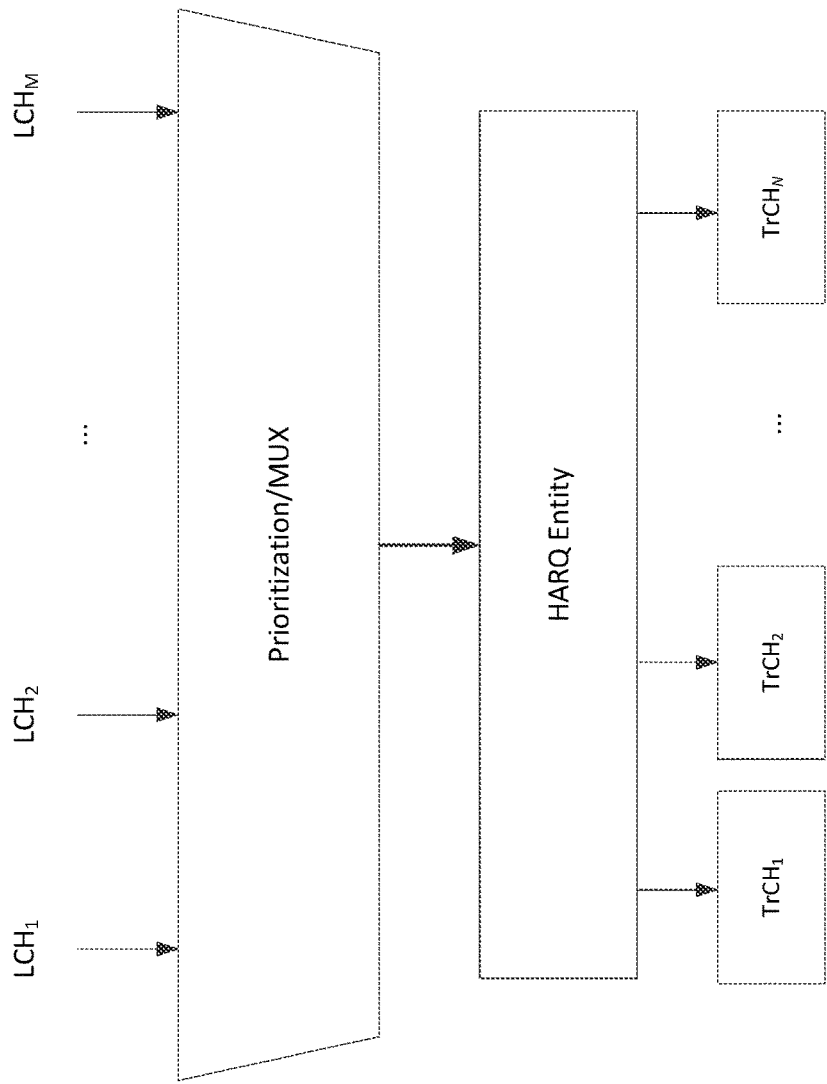
FIG. 10 illustrates example high level mapping between logical channel(s) (LCH) and SOMs.

A WTRU may be configured with a (e.g., a single) HARQ entity. The WTRU may have a (e.g., a single) HARQ buffer to manage for the HARQ signals received across the SOMs. The WTRU may be configured to transmit/receive traffic of any kind over any SOM. FIG. 10 illustrates an example mapping between LCH and one or more SOMs at a high level. For example, in FIG. 10 there may be one (e.g., at least one) HARQ entity per WTRU. Retransmission can take place over any SOM.

Figure 11:
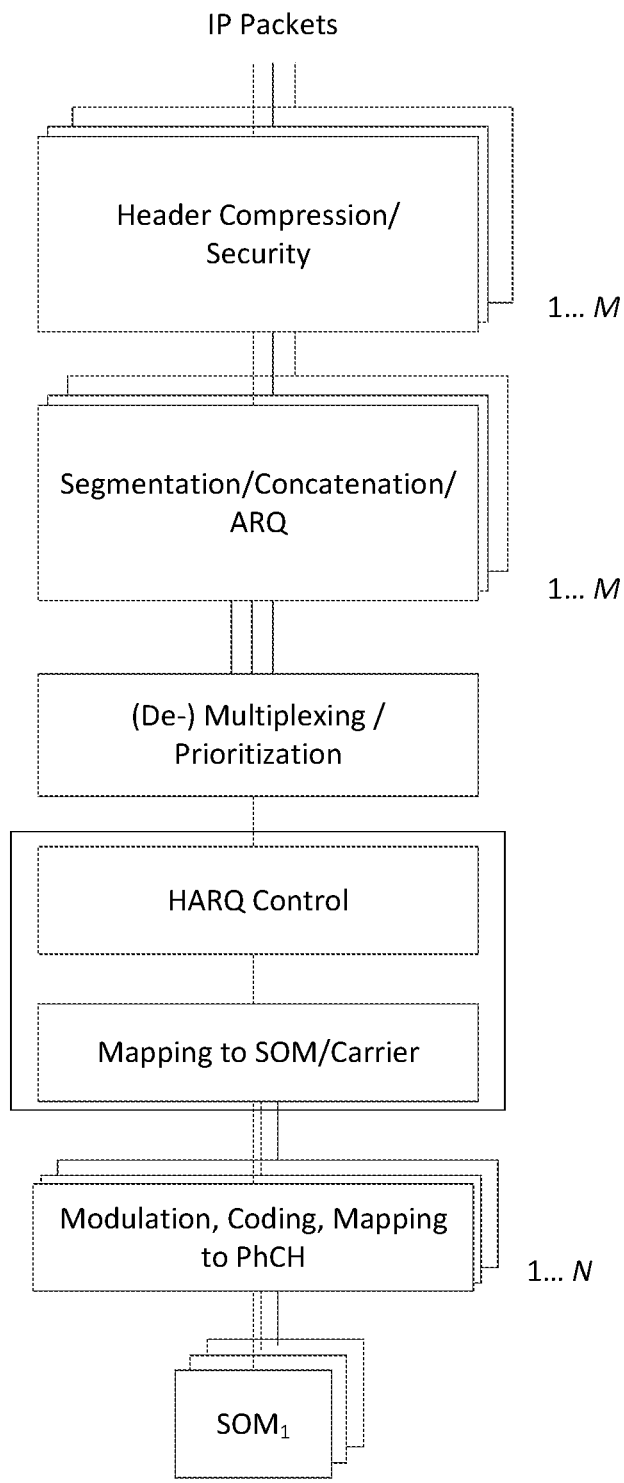
FIG. 11 illustrates an example (e.g., single) HARQ entity per WTRU technique in the context of a full protocol stack, and/or in the context of the full functions of a protocol stack.

FIG. 11 illustrates an example (e.g., a single) HARQ entity per WTRU technique in the context of a full protocol stack, and/or in the context of the full functions of a protocol stack. This example protocol stack may include (the example assumes M IP packets flows (and/or radio bearers) and N SOMs): header compression and/or security mechanism, security, segmentation/concatenation/ARQ, (de-)multiplexing/prioritization, HARQ/mapping to SOM/carrier, and/or modulation, mapping to physical channel (PhCH)/SOM. The header compression and/or security mechanism may take as input IP packets and/or perform header compression and/or apply security (e.g., integrity protection, ciphering), depending on the configuration. There may be as many such blocks as there are radio bearers—M in this example. Security may be in another network node, e.g., further from the 5G cell/TRP Segmentation/concatenation/ARQ may be responsible for segmenting and/or concatenating PDUs according to the radio resources available. The ARQ functionality may ensure delivery. De-multiplexing/prioritization, on the transmitting side (e.g., uplink for the WTRU), may be responsible for multiplexing one or more radio bearers PDUs together according to rules and/or prioritize the transmission. The multiplexing and/or prioritization rules may be configured by higher layers. The output of de-multiplexing/prioritization may be mapped to a SOM for transmission. Re-segmentation may be performed when needed. On the receiving side (e.g., downlink for the WTRU), de-multiplexing/prioritization may de-multiplex the SDUs and/or push them to the proper segmentation/concatenation/ARQ entity. HARQ/mapping to SOM/carrier may control the HARQ protocol and/or route to the proper SOM. The HARQ entity may perform the physical layer retransmissions and/or may route the PDUs to one or more, or any, SOM. In Modulation, mapping to PhCH/SOM may map the coded bits to appropriate symbols mapped to the appropriate resource on the physical channel of at least one of the selected $SOM_{(1 \ldots N)}$.

Figure 12:
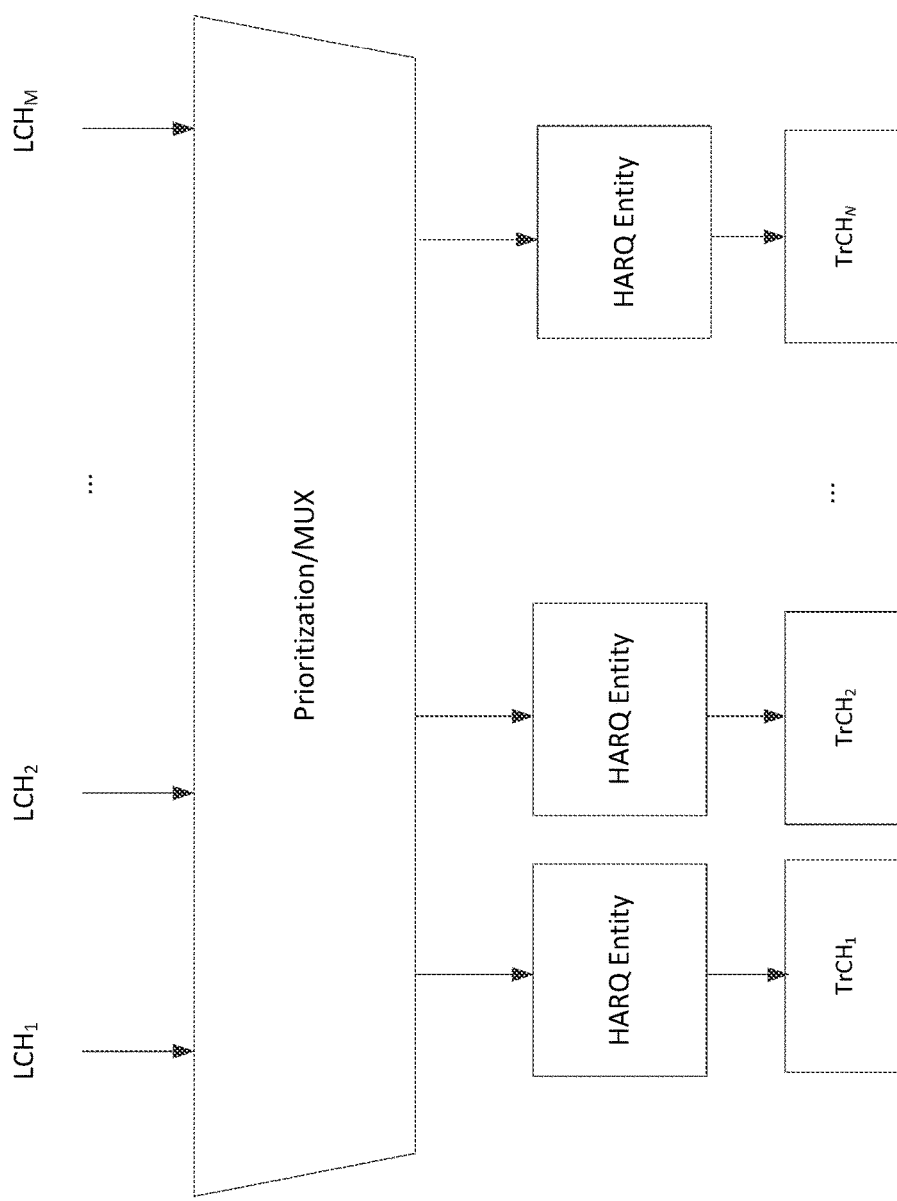
FIG. 12 illustrates example high level mapping between LCH and SOMs.
Figure 13:
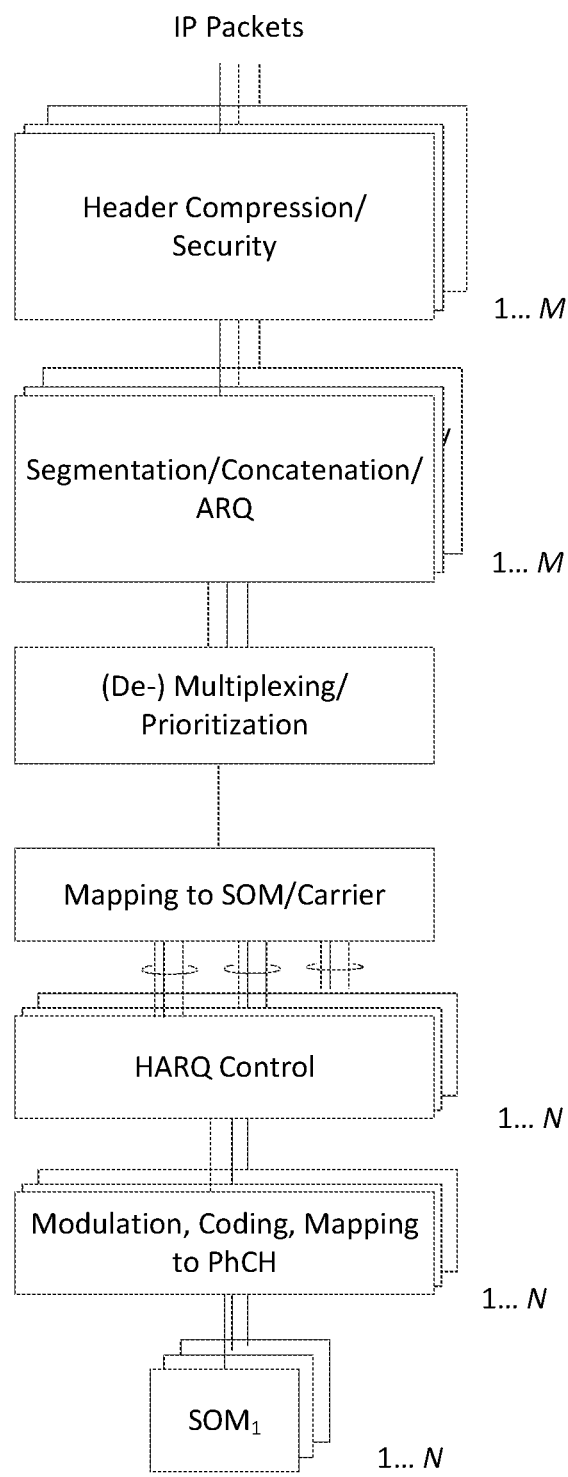
FIG. 13 illustrates example (e.g., single) HARQ entity per SOM technique in the context of a full protocol stack, and/or in the context of the full functions of a protocol stack.

A WTRU may be configured with a HARQ entity for one or more, or each, SOM configured. The logical channels may be assigned/mapped to any SOMs. Retransmission might not take place over one or more, or any, SOM. FIG. 12 illustrates an example high level mapping between LCH and one or more SOMs. One or more, or each, logical channel may be mapped to a SOM. A SOM may be associated with at least one (e.g., dedicated) HARQ entity. The WTRU may be configured to perform HARQ retransmissions within the same SOM of the original transmission. ARQ retransmissions may be carried on a different SOM. The WTRU may select a (e.g., best) SOM (perhaps for example according to predefined criteria) at one or more, or each, moment of time for a given PDU. FIG. 13 illustrates an example of a (e.g., a single) HARQ entity per SOM technique in the context of a full protocol stack, and/or in the context of the full functions of a protocol stack. The example protocol stack may include (the example assumes M IP packets flows (and/or radio bearers) and N SOMs) one or more of: a header compression and/or security mechanism, security, segmentation/concatenation/ARQ, de-multiplexing/prioritization, HARQ/mapping to SOM/carrier, and/or modulation, mapping to PhCH/SOM. Similar function(s) may performed as described herein with respect to FIG. 11. The mapping to a SOM/Carrier may be carried out before the HARQ entity. There may be N HARQ entities, for example at least one for one or more, or each, SOM. One or more HARQ retransmissions may be carried out in the same SOM.

Figure 14:
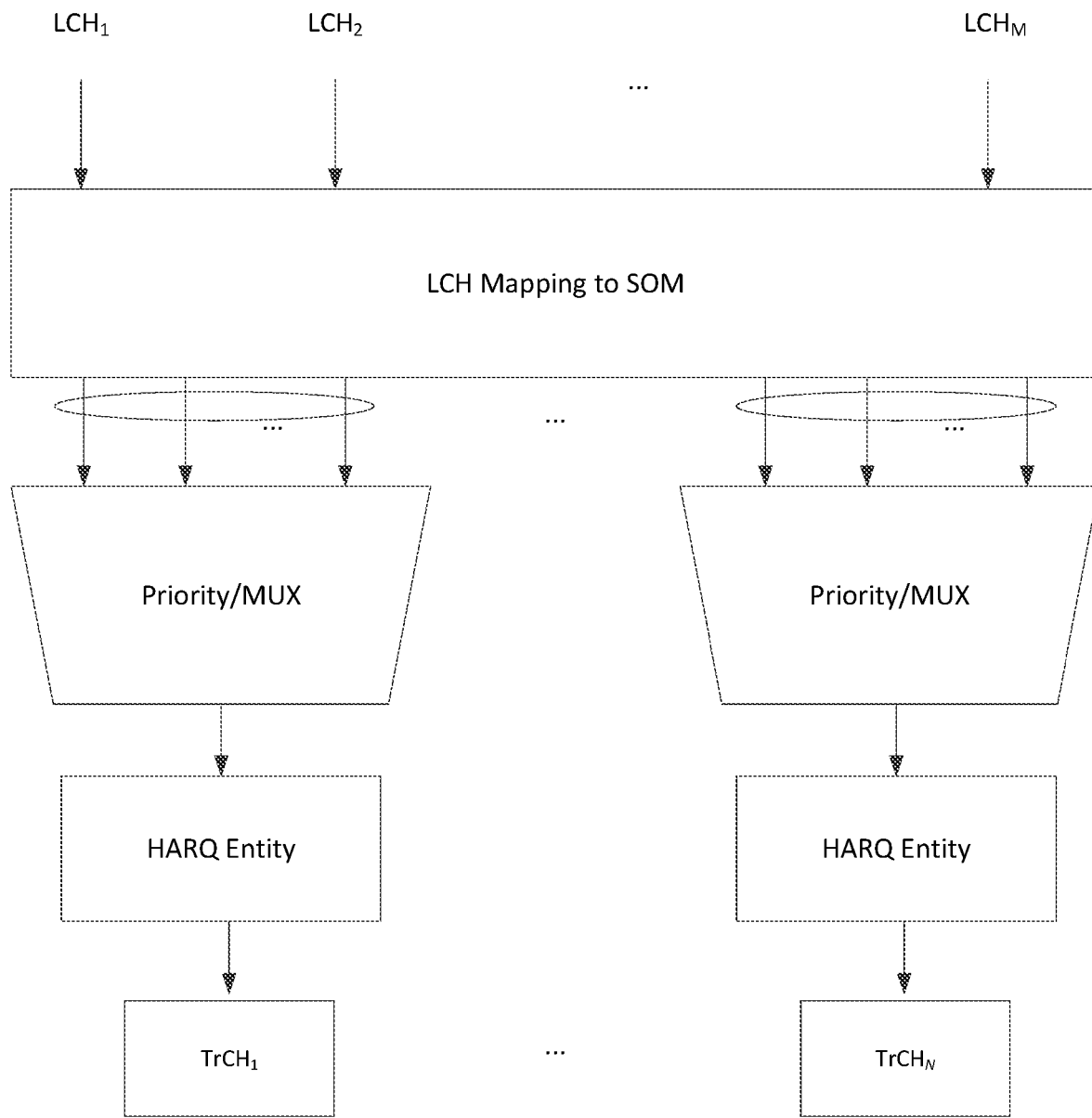
FIG. 14 illustrates an example high level mapping between LCH and SOMs.

The LCH may be mapped to a SOM using predefined rules. The mapping may be based on the requirements for the various type of traffic and/or one or more SOM capabilities. For example, a 10 ms TTI SOM might not be able to reach a 1 ms latency requirement, and/or might not be assigned to the channel carrying that traffic. FIG. 14 illustrates an example high level mapping between LCH and SOMs. For example, at least one HARQ entity may be allocated per SOM. A LCH may be mapped to one or more, or a single, SOM.

Figure 15:
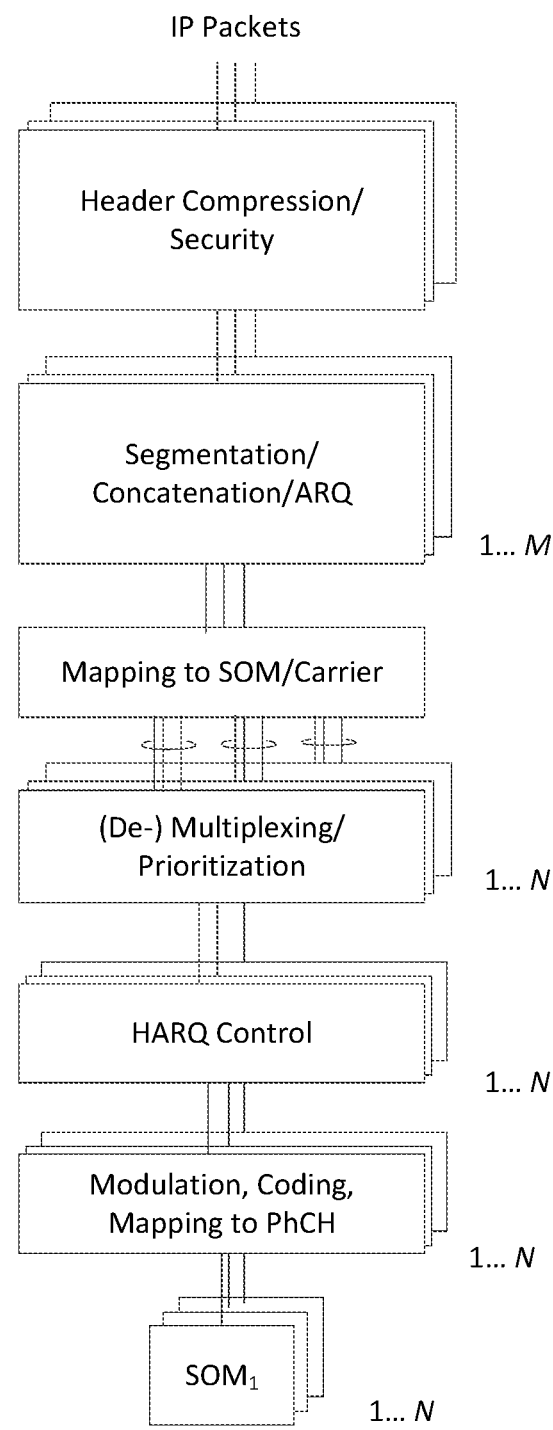
FIG. 15 illustrates an example (e.g., single) HARQ entity per SOM technique in the context of a full protocol stack, for example in the context of the full functions of a protocol stack.

FIG. 15 illustrates an example of a (e.g., a single) HARQ entity per SOM technique in the context of a full protocol stack, and/or in the context of the full functions of a protocol stack. As shown, an example protocol stack may include (the example assumes M IP packets flows (and/or radio bearers) and N SOMs): header compression and/or security mechanism, security, segmentation/concatenation/ARQ, de-multiplexing/prioritization, HARQ/mapping to SOM/carrier, and/or modulation, mapping to PhCH/SOM. Similar function(s) may performed as described herein with respect to FIG. 11. Although located below segmentation/concatenation/ARQ, the mapping to SOM/Carrier block may be located higher in the stack, even before header compression/security. After the mapping to SOM/carrier, the WTRU may configured with at least one set of one or more, or each, block for one or more, or each, SOM. The WTRU may perform prioritization on a per-SOM basis. The WTRU may determine the traffic priority for a (e.g., one or more, or each) SOM independently. ARQ retransmission may be carried out in the same SOM. The WTRU may be configured by higher layers (e.g., RRC signaling and/or other) with the SOM for a (e.g., one or more, or each) radio bearer.

A radio bearer may be mapped to one or more SOMs. The WTRU may be configured with, for one or more, or each, radio bearer, a set of SOMs it may use. The WTRU may dynamically determine, based on radio conditions, buffer status and/or other parameters, the SOM to use.

Temporary upgrade and/or downgrade of a LCH may be performed. An LCH and/or a radio bearer may maintain its general characteristics (e.g., priority, and/or bandwidth requirements, etc.), but may be upgraded to a higher priority and/or lower latency SOM, e.g., for a temporary period of time. Specifically, a service may have specific characteristics in general, but may have its service "temporarily upgraded". A logical channel may be moved to a different SOM for the period of time in which it is temporarily upgraded. The underlying PHY treatment of the same radio bearer/logical channel may be changed.

Multiplexing, prioritization and/or mapping to SOMs/TrCH of data from different logical channels may be performed. The creation of a MAC PDU and/or prioritization process may be initiated based on one or more triggers.

A WTRU may perform autonomous transmissions under certain situations, such as when time critical data has arrived at the WTRU which supersedes other ongoing (cell scheduled) transmissions. The WTRU might not be provided with the size and/or transport block parameters to be used by the cell. In response to a trigger in the MAC layer and/or from upper layers, the WTRU may multiplex one or more higher layer SDUs that may require immediate transmission into one or more MAC PDUs to be sent to the PHY layer for transmission. The autonomous creation of a transport block may be triggered by one or more of: the arrival of a time critical packet at the MAC layer and/or higher layers, the QoS-based parameter associated with one or more packets and/or data falling below a threshold, periodically (e.g., upon expiry of a timer), upon creation and/or (re)configuration of a latency critical and/or other service, and/or creation and/or (re)configuration of an SOM, based on an indication from the MAC layer and/or upper layers one of its buffers is no longer empty, and/or based on buffer occupancy information from the MAC layer and/or higher layers, and/or the HARQ entity indicating retransmission of a MAC PDU may be useful.

The WTRU may receive a trigger one or more, or each, time a low-latency SDU currently in its buffer has its time to live (TTL) that may become lower than a specific threshold. The WTRU, at the time of MAC PDU creation, may select the SDUs for which the TTL is below a threshold and/or multiplex them into the same MAC PDU. If a restriction related to the mapping of logical channels to transport channels exists, the WTRU may create separate MAC PDUs to send to the PHY layer while respecting these restrictions. The WTRU may (e.g., periodically, perhaps based on a timer) select the MAC SDUs for which the TTL may be below a threshold and/or perform multiplexing of these SDUs onto one or more MAC PDUs.

Mapping and/or multiplexing of LCH to TrCH/SOMs may be performed. The WTRU may be configured to transmit data from the different logical channels on the different SOMs on the uplink. One or more, or multiple, logical channels may be transmitted together in a (e.g., a single) transport channel (TrCH). The WTRU may be configured to receive scheduling information from the network indicating which logical channel to map to one or more, or each TrCH and/or SOM. The WTRU may (e.g., autonomously) determine the transmission parameters (including the SOMs and/or the multiplexing) dynamically.

Multiplexing and/or prioritizing one or more, or multiple, LCH to one or more, or each TrCH/SOMs may be performed. At least one LCH may be associated with at least one SOM. The term SOM and TrCH may be used interchangeably herein. A TrCH may be associated to the same SOM. While some of the techniques are described in the context of associating or mapping a LCH to a SOM, similar techniques may also be applicable for the multiplexing of one or more, or multiple, LCHs.

The WTRU may determine the transmission parameters based on pre-determined transport and/or service types. The MAC layer of the WTRU may multiplex a specific set of logical channels and/or service types to a set of distinct transport channels in such a way that a set of logical channels and/or services can (e.g., only) be mapped to specific transport channels. The WTRU may then create transport blocks and/or data blocks to be transferred to the PHY layer in such a way that a given transport channel may receive (e.g., receive only) data associated to the logical channels which can be mapped to that transport channel and/or that SOM.

The mapping between logical channel and associated transport channel may be defined statically based on a standardized mapping. For example, a set of transport channels T1, T2, . . . TN may correspond to different level of service, quality of service, and/or guarantee of service provided by the PHY layer. A set of logical channels L1, L2, . . . LM may be defined. The WTRU MAC layer may receive one or more packets from higher layers that may be identified to be part of a specific service type S1, S2 . . . SM. A WTRU may, based on a standardized mapping, multiplex certain logical channels to a specific transport channel. For example, L1, L2 may be multiplexed onto T1, L3 may be multiplexed onto T3, etc. Packets with service type S1, S2 may be sent on T1, packets with service type S3 may be sent on T2, etc.

The WTRU may determine the transmission parameters based on service type, e.g., ultra-reliable and/or low latency communication (URLLC), MTC, eMBB, etc. One or more specific transport channel may be associated with the logical channel/flows/services associated with ultra-reliable communications. Certain transport channel(s) may be associated with low latency communications. Certain transport channel(s) may be associated to machine type communication (MTC). Certain transport channel(s) may be associated to mobile broadband communication (MBB). Certain transport channel(s) may be associated to WTRU control information, and/or a last set of transport channels may be associated with one or more, or all, other communications. The mapping between logical channel/flows/services and transport channels may follow the rules of the association.

The WTRU may determine the transmission parameters based on mapping configuration on a per-SOM basis. The mapping of logical channels and/or service types to transport channels may be configurable by the network, e.g., through broadcast or dedicated signaling, and/or through the use of the access table by the WTRU.

Mapping of a multiplexing list may be performed on a per-SOM basis. For example, a multiplexing list may be mapped to SOM. For one or more, or each, LCH in one or more, or each, SOM a multiplexing list configuration may be generated. The WTRU may be configured (e.g., via higher layer and/or RRC signaling) with a set of multiplexing rules. The WTRU may be configured for one or more, or each, LCH with the set of (e.g., allowed) SOM it may be mapped to. The WTRU may be configured, for one or more, or each, SOM and/or one or more, or each LCH, with the set of (e.g., other) one or more LCH with which it may be multiplexed in a TrCH. The network may allow one or more (e.g., certain) LCH to be multiplexed in a SOM perhaps for example while not in a different SOM in some scenarios.

The WTRU may determine the transmission parameters/data transfer parameters, perhaps for example based on meeting LCH requirements, among other scenarios. The WTRU may be configured with a set of requirements for one or more, or each LCH. These requirements may include, for example, one or more of: latency and/or maximum delay, reliability, average bit rate, guaranteed bit rate, traffic and/or service type (e.g., Ultra-Low Latency/Ultra-High Reliability, MTC, eMBB, voice, video streaming, control information, etc.), and/or QCI, and/or the like.

The WTRU may be configured, and/or may determine on its own, the set of characteristics/capabilities of a configured SOM. These characteristics may include, for example, of one or more of: TTI duration, bandwidth, symbol rate, coding characteristics (e.g., a rate, a reliability, and/or the like), set of supported modulation and coding scheme (MCS), HARQ parameters (e.g., maximum number of retransmissions, incremental redundancy vs chase combining), subcarrier spacing, waveform and/or associated parameters (e.g., cyclic prefix length, guards, preamble, etc.), spectrum license mode (e.g., licensed, unlicensed, lightly licensed), a type of connectivity (e.g., device-to-device (D2D), and/or wide area network (WAN)), relay or direct, destination and/or TRP receiver point, set(s) of supported traffic types, and/or set(s) of supported QCI (and/or similar QoS index metric), etc.

The WTRU may determine set of LCH that may be multiplexed together in a given transport block in a given SOM. For example, the WTRU may determine the mapping of one or more, or each, LCH to SOM, perhaps based on the LCH requirements and/or the SOM characteristics. The WTRU may determine, for an LCH, whether the characteristics of a certain SOM meets the LCH requirements. The WTRU may determine a (e.g., a single) SOM for an (e.g., one or more, or each) LCH. The WTRU may determine, for one or more, or each, LCH, the set of SOMs that may meet the one or more LCH requirements.

For example, the WTRU may compare the latency requirement of a LCH and the minimum latency of a SOM based on e.g., the TTI length, the HARQ feedback delay, and/or other parameters and/or determine if the SOM meets the latency requirement. In such scenarios, among others, the WTRU may determine that the LCH may be mapped to that particular SOM. For example, the WTRU may compare the bit rate requirement for a specific LCH to the maximum bit rate achievable by a SOM (e.g., by the maximum MCS and/or available and/or configured bandwidth) and/or may map the LCH to the SOM, perhaps for example if it meets the requirement.

The WTRU may determine the mapping of LCH to SOM based on compatible properties of LCH, SOM. The WTRU may determine the mapping of LCH to SOM based on compatible LCH requirements and/or one or more SOM characteristics, for example using one or more of the requirements/characteristics described herein. The WTRU may multiplex LCH to the same SOM based on destination.

The WTRU may determine the mapping of LCH to SOM based on the destination associated to one or more, or each, logical channel. For example, some logical channels may be associated with D2D transmission to a particular device (e.g., L2 address). For example, an LCH may be associated with a particular TRP. The WTRU may configure LCH associated to the same destination (e.g., D2D, TRP, and/or other) to the associated SOM.

The WTRU may determine the mapping of LCH to SOM based on a set of QoS Class Identifier (QCI) supported. The WTRU may be configured with a set of support QCI for an (e.g., one or more, or each, SOM). The WTRU may determine the set of SOM for one or more, or each, LCH, perhaps for example based on the configured LCH QCI. The WTRU may determine that a LCH may be mapped to a SOM when (e.g., only when) there is an exact QCI match. The WTRU may be configured to determine the set of SOM that at least meet the QCI of the LCH.

The WTRU may determine the mapping of LCH to SOM based on traffic type supported. The WTRU may be configured with a set of traffic type supported for one or more, or each, SOM. The WTRU may determine the mapping of one or more, or each, LCH to SOM, perhaps for example based on the LCH traffic type. For example, a SOM may be configured to support best effort traffic (e.g., 60 GHz, unlicensed). The WTRU may map best effort LCHs to that SOM and/or map other type of traffic (e.g., conversational voice, ultra-high reliability and/or other) to a different SOM (e.g., in the 2 GHz band, for example).

Mapping of LCH to SOM/TrCH may be performed dynamically. Transport channel may be selected based on transport layer state/property information. A WTRU may select from one or more (e.g., available) transport channels (e.g., T1 and/or T2) for which a specific logical channel can be mapped onto and/or onto which a specific higher layer packet may be transmitted. The WTRU may make such determinations based on a dynamic state of the transport channel (e.g., at a given time), and/or the MAC entity information. The information may include one or more of: the current occupancy of the logical channel(s) (and/or queues associated with one or more, or each, logical channel) being considered, QoS-based parameter associated with the data in a given logical channel, such as TTL of a packet the TTL of a set of packets, and/or the TTL relative to a threshold, and/or the size of a packet and/or group of packets.

Figure 16:
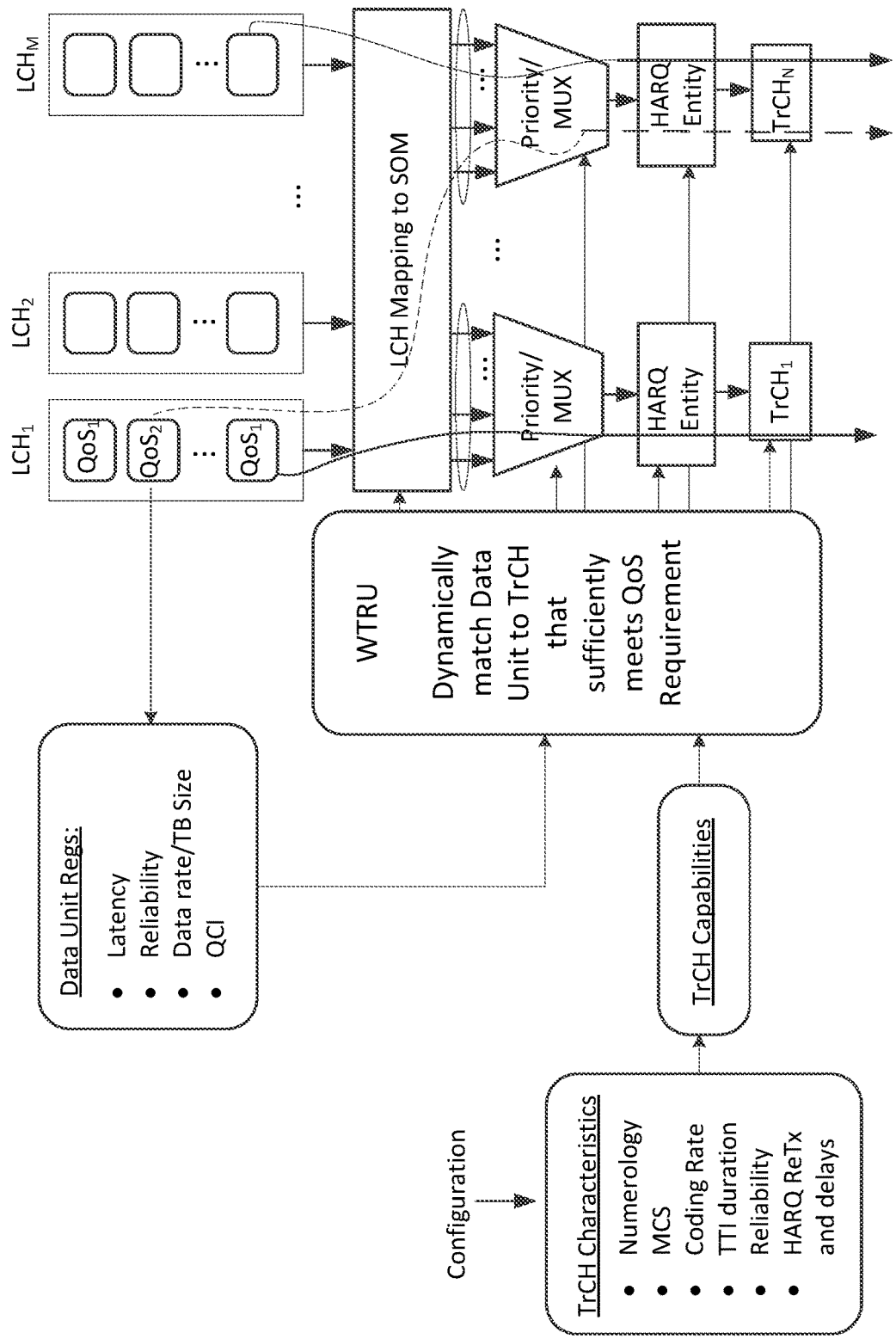
FIG. 16 illustrates an example of a WTRU Controller dynamically matching data units to TrCH that may meet the QoS requirement of the data units.

FIG. 16 illustrates an example of a WTRU (e.g., a WTRU processor and/or controller) dynamically matching data units to TrCH that may meet the QoS requirement of the data units. One or more, or each, data unit may have its own QoS requirement (QoS_1, QoS_2, etc.). In some scenarios, one or more data units can have the same QoS requirement. The Data Unit requirements may include one or more of: latency, reliability, data rate and/or Transport block size, and/or QCI, etc. The WTRU may be configured with one or more, or multiple, transport channels, one or more, or each, with their own characteristics in terms of one or more of: numerology (e.g., which may include a subcarrier spacing and/or an associated symbol duration), MCS, coding rate, TTI duration, reliability, HARQ retransmission, and/or delays, etc.

The WTRU may determine for one or more, or each, data unit the target TrCH by matching the requirements to the TrCH capabilities. This may ensure that the requirements for the data unit are met, perhaps at least to a satisfactory degree. In FIG. 16, data units from the $LCH_M$ may be mapped to $TrCH_N$. A (e.g., specific) data unit of $LCH_1$ with $QoS_2$ may also be routed to $TrCH_N$, for example because its QoS requirement (e.g., $QoS_2$) might not be met by $TrCH_1$ in this scenario. The $LCH_1$ and $LCH_M$ data units (e.g., such as those mapped to $TrCH_N$) may be multiplexed together, perhaps for example if the data units have sufficiently compatible QoS requirements (e.g., within a determined and/or preconfigured difference tolerance and/or threshold).

The WTRU may send a transmission of a one or more, or multiple, uplink data units. For example, the WTRU may send a transmission of a first uplink data unit and a second uplink data unit. The WTRU may identify a first Quality of Service for the transmission of the first uplink data unit. The WTRU may identify a second QoS for the transmission of the second uplink data unit. The WTRU may determine that a difference between/of the first QoS and the second QoS is within a preconfigured threshold, or outside the preconfigured threshold. The WTRU may multiplex the second uplink data unit with the first uplink data unit in the transmission, perhaps for example when the difference between/of the first QoS and the second QoS is within a preconfigured threshold. The second uplink data unit maybe multiplexed with the first uplink data unit in the transmission, perhaps for example up to a preconfigured multiplex ratio (as described herein).

The WTRU may receive such dynamic transport layer state information from the PHY layer. For instance, the MAC layer may make its determination of mapping based on information dynamically provided by the PHY layer and/or statically associated with a specific transport channel and/or transport channel type. Such information may include one or more of: the amount of PHY resources available for a specific transport channel, the type of PHY resources available for the transport channel (e.g., contention based vs. dedicated, and/or TTI used by the transport channel), HARQ information, such as HARQ process type, number or processes, occupancy of one or more, or each, process, and/or status of the available HARQ processes (e.g., pending TX or re-TX) of the associated transport channel, SOM over which the transport channel is mapped, and/or a maximum transport block size supported for a transport channel and/or currently allowed for the transport channel.

One or more transmission channels may be reserved for retransmissions. One or more special transport channels may be reserved specifically for the purpose of retransmission by the WTRU. The WTRU may, upon failed transmission of a PDU at a layer (e.g., MAC/RLC/etc.), retransmit that PDU using at least one of the reserved transport channels. These transport channels may have specific PHY/MAC properties, including, shorter TTI, and/or HARQ process type allowing more HARQ re-transmissions within a shorter period of time, higher coding rate, lower modulation scheme, and/or larger transmission power.

Incompatible multiplexing of LCH may be avoided or reduced. The WTRU may dynamically determine which set of LCH from the set of allowed LCH may be multiplexed together in an actual transport channel. As used herein, the term "multiplexing" may be equivalent to the term "segmentation/assembly" and may be used interchangeably.

The transmission characteristics of a larger amount of data may be determined based on the latency requirement associated with a small amount of data. For example, an LCH with low latency requirement may be multiplexed with a logical channel with much larger latency requirement. LCHs associated with much different reliability requirement may be multiplexed.

Multiplexing restrictions may be imposed based on logical channels. For example, a WTRU may perform segmentation/assembly across (e.g., only across) MAC SDUs that are associated with a specific logical channel/service type/priority. For example, the MAC layer may perform separate segmentation/assembly operations on SDUs coming from logical channels and/or upper layer services associated with ultra-low latency, and a different segmentation/assembly operation on SDUs associated with high reliability transmissions.

SOM/transport channel for transmission of control information may be selected and/or multiplexed. The MAC layer may transmit different types of control information over different underlying transport channels and/or PHY resource types. For example, a MAC CE may be of different types. Perhaps for example depending on the MAC CE type, a WTRU may determine whether to transmit such a MAC CE on a given transport channel, and/or multiplex a MAC CE with a specific set of MAC SDU and/or SDU segments.

For example, the WTRU may have a different MAC CE for transmission of buffer status report (BSR) associated with its low-latency logical channels. A WTRU may transmit a CE such as a "ULL MAC CE" over (e.g., only over) the dedicated ULL transport channel (for example, by piggybacking the MAC CE on a transport block containing a ULL MAC PDU). Such a restriction may, however, allow for non-ULL MAC CEs to still be sent with ULL resources, and/or may require them to be sent using (e.g., only using) the non-ULL transport block resources.

For example, high priority MAC CEs may associated with (e.g., exclusively with) a transport channel dedicated for transmission of such information. The transport channels may, for example, be associated with dedicated PHY resources.

WTRU may multiplex LCH(s) with requirements up to a certain fraction of primary LCH. For example, the WTRU may be configured with a set of parameters controlling the amount of data of varying requirements that can be multiplexed together.

The WTRU may determine a primary LCH and an associated primary LCH set. The primary LCH may be selected by the WTRU based on the priority (e.g., using techniques described herein). The WTRU may determine the associated primary LCH set that may include LCH(s) with the same or similar requirements as the primary LCH and/or may be multiplexed with it according to WTRU configuration. The primary LCH set may be configured by the network (e.g., similar to a multiplexing list) and/or may be determined by the WTRU based on the requirements for the LCHs. The primary LCH may belong to the primary LCH set. The WTRU may determine a non-primary LCH set that may include the set of LCH that might not be part of the primary LCH set and/or may be multiplexed with the primary LCH.

The WTRU may be configured with a ratio $\rho$ indicating the maximum amount of data from the non-primary LCH set that may be allowed to be multiplexed with a chosen primary LCH set in a given transport block. For example, if the WTRU has determined that Np bits from the primary LCH set are to be transmitted in a certain transport block, the WTRU may multiplex up to N non-$p<\rho \times Np$ bits from non-primary LCH set in the same transport block. For embodiment, the non-primary LCH and/or primary LCH may include (e.g., only include) LCH(s) for which data is available in the associated buffer.

The WTRU may multiplex LCH(s) based on their associated data type(s). The WTRU may multiplex LCH(s) such that the differences in data type may be minimized. The WTRU may select MAC SDUs for assembly in such a way that the MAC PDU has a minimum percentage of data of a specific type (e.g., logical channel type, service type, latency requirement, etc.) so that the MAC PDU may be associated with that type. For instance, the WTRU may ensure that the maximum possible number of low-latency SDUs and/or SDU segments are assembled together, and/or minimize the number of non-low-latency segments that are assembled together with low-latency segments.

The WTRU may associate a logical channel, a MAC SDU and/or SDU segment, with a specific multiplexing category and/or class. The category and/or class may be associated with any combination of, logical channel, type of data (time critical vs high reliability requirements vs high efficiency requirements), strictness of latency requirement of associated data, and/or QoS-based parameter related to data. The WTRU may create a MAC PDU such that a certain minimum percentage of data within the PDU are associated with that category and/or class (for example—60% of data associated with time critical data where TTL may be below a specific threshold). Low-latency MAC SDU segments may be mostly placed in PDUs that are primarily composed of low-latency data. The underlying PHY layer may treat such MAC PDUs with higher priority. The category and/or classes may be defined in a dynamic manner. For example, based on the current data to be transmitted, the WTRU may create the specific conditions that may define the class.

The WTRU may multiplex LCH and/or SDUs based on latency characteristics (e.g., TTL Ranges). The WTRU may perform multiplexing of MAC SDUs by taking into account the latency characteristics associated with the SDU, and/or associating the MAC SDUs that may satisfy a specific QoS-based characteristic together.

For example, the WTRU may, perhaps when creating a MAC PDU, assemble MAC SDUs and/or MAC SDU segments that may have the same TTL. The WTRU may, when creating a MAC PDU, assemble MAC SDUs and/or MAC SDU segments that may have TTLs that may differ by not more than a threshold between each other. The resulting MAC PDUs (and/or effectively transport blocks) may be ordered in terms of TTL and/or TTL range.

The WTRU may multiplex LCH(s) with differences in latency requirements. For example, the WTRU may multiplex and/or transmit in the same transport block data packets for which the latency requirements is no less than ΔLatency away. Parameter/variable ΔLatency may be a fixed value configured by the network and/or fixed in the specifications. Parameter/variable ΔLatency may be dynamically and/or semi-dynamically signaled to the WTRU.

The WTRU may multiplex LCH(s) and/or SDUs based on TTI Duration to be utilized in PHY layer. The WTRU may perform segmentation/assembly of MAC SDUs based on the TTI to be utilized for transmission over the PHY layer. The WTRU may associate a MAC SDU and/or a logical channel/flow/service with a (e.g., specific) TTI. The SDUs may be assembled/segmented, in such a way that the (e.g., one or more, or all,) SDU segments to be used in creating a MAC PDU may utilize the same TTI value. The SDU segments may effectively be the TTI duration with which the PHY layer transmits the PDU. The TTI to be associated with a specific MAC SDU could be determined by the WTRU. For example, the TTI may be associated, statically and/or dynamically through signaling by the cell and/or based on some internal state of the WTRU, with the logical channel/service type of the data in the MAC SDU. For example, a specific logical channel and/or any logical channel may be configured to utilize a specific TTI value. For example, the TTI to be utilized may be defined by the PHY layer information, (e.g., in combination with potentially other methods). For example, the PHY layer could indicate at a given time instant, and/or during a period of time, that TTI of 0.5 ms is available and/or may be used for the logical channel groups with index x and/or larger. For example, the TTI may be defined by the QoS-based parameter associated with the logical channel. For example, if the TTL for an SDU is below a threshold x, the WTRU may utilize two-symbol TTI. If the TTL is above threshold x, but below threshold y, the WTRU may utilize TTI 0.5 ms, and so on. The WTRU may include SDUs associated with a different TTI in the associated grant, once the pending SDUs with the current TTI value have been included.

The WTRU may send one or more, or multiple, transport blocks (TBs) of LCH with different requirements using one or more, or multiple, TrCHs. Data of largely varying requirements may be transmitted simultaneously. The WTRU may transmit one or more, or multiple, transport blocks (e.g., simultaneously) each on its own TrCH.

Based on specific scheduling decision made by the WTRU (e.g., TTL, logical channel prioritization (LCP), and/or buffer occupancy, of such rules), the WTRU may schedule more than one set of data with highly varying characteristics and/or having very different service type, and/or requirements, etc. The WTRU may transmit the MAC PDUs associated with such different service types using different transport formats. The WTRU may transmit the different transport blocks using the same grant from the cell, and/or the same semi-static resources provided to the WTRU.

The WTRU may receive (dynamically and/or semi-statically) a grant that may indicate a set of available PHY resources (number of transport blocks, and/or the like). The WTRU may receive an indication on the radio quality of such resources, for example via downlink channel state information (CSI) feedback. The WTRU may make an autonomous decision about the transport format to utilize when transmitting on these resources (e.g., based on the radio quality associated with the resources).

The WTRU may divide the grant spectrum for one or more, or each, TrCH. The WTRU divide the PHY resources into distinct portions to be associated with one or more, or each, of the transport blocks to be transmitted. The WTRU may restrict the division based on specific rules associated with specific association of carriers, resource blocks, or the like. For instance, the WTRU might not be allowed to divide a resource block between two different transport blocks to transmit. The WTRU may associate a different transport format (MCS, HARQ type, TTI, retransmission rules, etc.) with one or more, or each, of the transport blocks to be transmitted simultaneously. The WTRU may indicate to the cell the specific transport formats utilized in a transmission. Such signaling may be included within the transmission itself (e.g., based on methods described herein). The WTRU may include such signaling in a dedicated control channel used for UL PHY signaling.

The traffic types may be prioritized in the MAC for transmission for UL. Traffic may be associated with different latency requirement, may be mapped to different SOMs, and/or may have different reliability requirement(s).

The WTRU may prioritize traffic based on the associated latency requirements. For example, a WTRU may select MAC PDUs to be scheduled for transmission based on the time criticality of the data, and/or the time available for the data in the MAC PDU before the data is considered to have missed its timing requirements. For instance, a WTRU may select MAC PDUs for transmission based on the QoS-based parameter value and/or the range associated with the MAC PDU, and/or potentially assigned to that MAC PDU by the WTRU.

At a specific scheduling instant and/or TTI, and/or at the specific time in which a PHY resource becomes available to the WTRU, the WTRU may select the pending MAC PDU having the smallest TTL and/or TTL range among the pending MAC PDUs. The WTRU may select one or more, or multiple, available PDUs for transmission, perhaps for example at the same time instant, and/or substantially at the same time. The WTRU may select, of the buffered PDUs, those with the smallest TTL and/or TTL ranges.

The WTRU may perform assembly in combination with the scheduling criteria described herein. For example, the WTRU may, in satisfying a grant and/or available resource for transmission, select the MAC SDUs with the smallest TTL and/or perform multiplexing/assembly perhaps for example in order to include the MAC SDUs having the lowest TTLs of the pending MAC SDUs.

The WTRU may perform such scheduling decisions on a subset of transport channels, SOMs, and/or the like. For example, the WTRU may perform such scheduling decisions in (e.g., only in) transmission to a subset and/or TRPs. The WTRU may perform such scheduling decisions when (e.g., only when) being provided a grant for resources on a specific transport channel and/or SOM (for example, associated with ULLRC transmission).

The WTRU may prioritize traffic based on PHY layer providing TTI of grant. For example, the MAC layer may perform its scheduling decisions, based on the TTI that may be provided by the PHY layer. The MAC layer may receive along with the information for a transmission grant, the TTI with which the transmission may take place. The WTRU may select the MAC SDUs to be multiplexed onto the MAC PDU based on knowledge of this TTI. For instance, if a short-TTI grant is provided, the WTRU may select the MAC SDUs associated with logical channels that may be for low-latency transmission. The WTRU may select the MAC SDUs for which the TTL may be below a specific threshold. The WTRU may receive one or more, or multiple, grants that may apply at different TTIs and/or for different TTI lengths.

The MAC layer may dynamically select and/or determine the TTI length to be used to transmit a MAC PDU. Such determination may be made by the WTRU on the TTI and/or scheduling instant itself. The determination may be made sometime in advance of the TTI, for a period of time, and/or for a set of resources for which the WTRU MAC has been informed of available resources.

The WTRU may receive an indication of certain resources and/or resource sets where the MAC layer may select the TTI. The WTRU may select, based on scheduling decisions and/or prioritization rules, the data to be transmitted on the resources with shortened TTI. The determination may be such that the data with time critical requirements can be transmitted in the time required when taking into account potential retransmissions. For example, the MAC layer may receive an indication (potentially from information from the PHY layer) of the location and/or amount of resources for which shortened TTI may be utilized. The MAC layer may receive an indication of the current data to be transmitted and/or the TTL associated with this data. The MAC layer may schedule transmissions based on this information by ensuring that the latency critical transmissions are performed successfully. The specific TTI to use for a specific MAC PDU might not be restricted. The transport block size for such planned transmissions may be driven by the amount of resources that may be associated with shortened TTI in the next subframe, frame, and/or longer period of time.

Logical channel prioritization may be performed for multiplexing of time critical data with non-time critical data—partially using legacy LCP. Different logical channel types (e.g., low latency, ultra-reliable, MBB, etc.) can be multiplexed onto the same MAC PDU, the WTRU may first select MAC SDUs that may be time critical for inclusion into a MAC PDU before performing the legacy LCP procedure.

Specifically, the WTRU may determine the MAC SDUs for which are considered time critical. This determination may be based on one or more of: the TTL associated with the SDU is below a threshold, the TTL associated with the SDU that is below a threshold has expired, the SDU comes from a specific logical channel and/or flow identified by the WTRU for being latency critical, the size of the SDU is below a specific threshold, and/or the SDU has already been transmitted (e.g., unsuccessfully) in a previously transmitted PDU and may represent a retransmission.

The WTRU may include the selected SDUs into the MAC PDU to transmit. The WTRU may include the SDUs in order of some specific criteria, such as a QoS-based parameter, size, and/or logical channel priority. If the size of the MAC PDU is insufficient to include the time-critical SDUs, the WTRU may perform one or more of: including up to the number of SDUs which fit in the MAC PDU by respecting a potential ordering of inclusion, triggering the PHY layer to transmit a request for further resources and/or include a request for further resources (e.g., a PHY layer indication for more resources) with the transmission of this MAC PDU, including a BSR and/or similar MAC CE in the MAC PDU to indicate this condition to the cell, triggering an autonomous transmission at the WTRU, which may include additional time-critical SDUs, and/or include a request for resources, and/or triggering the PHY layer to utilize a shortened TTI for transmission of this MAC PDU.

The WTRU may perform legacy LCP to serve the logical channels up to the PBR. The WTRU may take into account the data selected in the second step, as having already been used when considering whether a logical channel has been served up to its PBR.

The WTRU may select MAC SDUs for the remainder of the MAC PDU according to one or more of: the logical channel priority, as per legacy LCP. The WTRU may select one or more SDUs that may have a second level of time criticality (for example, the TTL being above the first threshold, but below a second threshold).

The amount of data included in the MAC PDU while performing LCP may differ from the current LCP. The WTRU may select MAC SDUs for creation of a MAC PDU by selecting MAC SDUs from potentially different buffers (e.g., associated with logical channels, flows, services, etc.) in order of time criticality. Time criticality may be measured, for example, by TTL. In other words, a WTRU could select SDUs in order of TTL, starting with the smallest TTL and/or until the MAC PDU is filled.

The WTRU may select MAC SDUs for creation of a MAC PDU by selecting MAC SDUs in order of time criticality (e.g., smallest to largest TTL) and/or importance based on any QoS-based parameter until the MAC SDUs with a certain criticality are addressed (for instance, TTL less than a threshold). The remainder of the MAC PDU size can be used for, padding, control data (MAC CEs), and/or increasing the coding and/or redundancy.

The WTRU may select MAC SDUs for creation of a MAC PDU with some added restrictions on the logical channels/flows/services that it selects. For instance, the selection may be restricted to one or more of the logical channels, perhaps for example up to a specific threshold, before the other logical channels can be considered.

The WTRU may be configured, for one or more, or each, LCH, with a priority index. The priority index may be used, for example, to determine the order in which PDUs of the same time delay requirement are scheduled. The priority index may indicate the order in which PDUs of the same type and/or class (e.g., best effort) are scheduled.

The WTRU may determine the order in which PDUs that do not meet their latency requirement may be dropped. More specifically, a WTRU may be configured to determine the order in which PDUs are transmitted according to (e.g., first according to) their delay requirement, and/or according to the priority order. If there are not sufficient resources to transmit the PDUs, then the WTRU may determine to drop PDUs with lower priority index (e.g., delete the PDUs from the buffer and/or not attempt transmission, as the packet has expired).

The WTRU may (e.g., autonomously) select transmission parameters. Transport format may be selected. For example, the WTRU may select the transport format from a preconfigured list associated with traffic type, LCH, and/or SOM.

The WTRU (e.g., the MAC layer) may receive an indication of the transport format(s) that may be usable for a specific grant. For example, a WTRU may be provided with a choice of transport formats to be used on a grant provided by the cell, and/or the WTRU may select the appropriate transport format and/or corresponding MAC PDU size based on, one or more of: the characteristics of data which the WTRU is planning to transmit (e.g., time-critical, reliability, high efficiency, etc.), the buffer status in the WTRU, potentially associated with one or more, or each, type of data, and/or QoS-based parameter associated with one or more, or each, packet being selected.

Different transport formats may be associated with a service and/or service type (e.g., ULRRC transport format (TF), and/or eMBB TF, etc.). The transport formats may be associated with different levels of reliability (e.g., an error probability) and/or transmission rate.

The WTRU may associated with one and/or more, or each, transport format signaled by the cell with a service and/or service type. The association may be signaled as part of the transport formats themselves, for example through an index and/or special field. The association may be fixed/static and/or known previously by the eNB and/or WTRU. The WTRU may choose its own association based on the characteristics of one or more, or each, TF (e.g., more coding may be associated with more reliable communication). The WTRU may be given a range of services and/or service types to which it may associate a given TF.

The WTRU may be configured with a set of transport formats for one or more, or each, SOM. The WTRU may determine the set of transport formats to use based on the SOM to be used for transmission. The WTRU may, based on the configuration, select the TF which matches the type of data to be sent. Specifically, based on the services associated with the data (and/or majority of the data) in the MAC PDU, the WTRU may make the TF selection.

A WTRU, following selection of the transport format, may indicate the selected format to the cell in the transmission. The WTRU may provide this information as an index transmitted on a PHY-layer uplink control channel, such as PUCCH and/or a 5G control channel.

The WTRU may pre-pend/append to the uplink transmission (on the granted resources themselves), an index which may be encoded using a predefined and/or fixed mechanism. Such a transport format indication from the WTRU may be present with the UL transmissions. The WTRU might not provide such indication, and/or the cell may be required to before blind decoding to determine the selected TF.

The WTRU may receive an indication of a specific TF in the grant, but may determine to dynamically change the TF and/or inform the cell of this decision. The WTRU may be restricted to change the TF of the grant (e.g., only) on MAC PDUs that may contain data from specific logical channels and/or specific services. The WTRU may be restricted to change the TF from the currently signaled TF to a finite set of "derived" TFs which may have some specific relation to the original TF (thus facilitating the signaling of the derived TF to the cell).

The WTRU may change the TF in order to add additional coding to data being scheduled for example to increase robustness. The decision for adding additional coding may be based on one or more of: the reliability and/or latency requirements associated with the data that needs to be sent, the QoS-based parameter associated with the data to be sent, and/or other data pending transmission, buffer occupancy, or lack thereof, and/or whether the MAC PDU is being re-transmitted, or whether it is an initial transmission of the PDU.

The WTRU, perhaps for example after processing a certain number of logical channels (e.g., up to the Prioritized Bit Rate (PBR)), and/or a certain number of MAC SDUs taking latency critical requirements into consideration), may determine to not include additional SDUs into the MAC PDU. The WTRU may indicate to the PHY layer to increase the redundancy (for example by reducing the code rate) associated with a specific MAC PDU. For example, after the MAC SDUs having TTL below a threshold are included into the MAC PDU, and/or the logical channels have been served up to the PBR, the WTRU might not include additional MAC SDUs ready for transmission into the MAC PDU and/or may reduce the coding rate (at the PHY layer) of the resulting MAC PDU.

A WTRU, perhaps for example following a re-selection of the transport format, may indicate the selected format to the cell in the transmission (e.g., using at least one of the techniques described herein).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a processor configured to:
receive configuration information associated with a plurality of logical channels, wherein the configuration information comprises information indicating respective requirements for each of the plurality of logical channels;
receive downlink control information (DCI) comprising an indication of physical channel resources, wherein at least one of the physical channel resources is associated with a transmission duration; and
select one or more of the plurality of logical channels based on one or more of the respective requirements for each of the one or more of the plurality of logical channels being satisfied by the transmission duration; and
transmit data associated with the selected one or more of the plurality of logical channels utilizing the at least one of the physical channel resources.

2. The WTRU of claim 1, wherein the at least one of the physical channel resources is associated with at least one of: a bandwidth, a symbol rate, a coding characteristic, a set of supported modulation and coding schemes (MCS), or a numerology.

3. The WTRU of claim 1, wherein the transmission duration is less than or equal to 1 millisecond (ms).

4. The WTRU of claim 2, wherein the numerology comprises a subcarrier spacing or an associated symbol duration.

5. The WTRU of claim 1, wherein the processor is further configured to select the one or more of the plurality of logical channels pursuant to a logical channel prioritization (LCP) procedure that defines the one or more respective requirements for each of the plurality of logical channels.

6. The WTRU of claim 1, wherein the respective requirements for each of the plurality of logical channels comprise at least one of a low latency service requirement or an ultra-reliable service requirement.

7. The WTRU of claim 1,
wherein the at least one of the physical channel resources is associated with a subcarrier spacing, and
wherein the processor configured to select the one or more of the plurality of logical channels is further configured to select the one or more of the plurality of logical channels based on one or more of the respective requirements for each of the one or more of the plurality of logical channels being satisfied by the subcarrier spacing.

8. A method performed by a wireless transmit/receive unit (WTRU), the method comprising:
receiving configuration associated with a plurality of logical channels, wherein the configuration information comprises information indicating respective requirements for each of the plurality of logical channels;
receiving downlink control information (DCI) comprising an indication of physical channel resources, wherein at least one of the physical channel resources is associated with a transmission duration; and
selecting one or more of the plurality of logical channels based on one or more of the respective requirements for each of the one or more of the plurality of logical channels being satisfied by the transmission duration; and
transmitting data associated with the selected one or more of the plurality of logical channels utilizing the at least one of the physical channel resources.

9. The method of claim 8, wherein at least one of the wireless physical channel resources is associated with at least one of: a bandwidth, a symbol rate, a coding characteristic, a set of supported modulation and coding schemes (MCS), or a numerology.

10. The method of claim 9, wherein the transmission duration is less than or equal to 1 millisecond (ms).

11. The method of claim 9, wherein the numerology includes a subcarrier spacing or an associated symbol duration.

12. The method of claim 9, wherein selecting the one or more of the plurality of logical channels comprises selecting the one or more of the plurality of channels pursuant to a logical channel prioritization (LCP) procedure that defines the respective requirements for each of the plurality of logical channels.

13. The method of claim 8, wherein the respective requirements for each of the plurality of logical channels comprise at least one of low latency service requirement or an ultra-reliable service requirement.

14. The method of claim 8,
- wherein the at least one of the physical channel resources is associated with a subcarrier spacing, and
- wherein selecting the one or more of the plurality of logical channels comprises selecting the one or more of the plurality of logical channels based on one or more of the respective requirements for each of the one or more of the plurality of logical channels being satisfied by the subcarrier spacing.

* * * * *

UNITED STATES PATENT AND TRADEMARK OFFICE
CERTIFICATE OF CORRECTION

PATENT NO. : 11,729,781 B2
APPLICATION NO. : 16/089960
DATED : August 15, 2023
INVENTOR(S) : Benoit Pelletier et al.

It is certified that error appears in the above-identified patent and that said Letters Patent is hereby corrected as shown below:

In the Claims

In Claim 10: Column 36, Line 61, delete "claim 9" and insert -- claim 8 --.

In Claim 12: Column 36, Line 66, delete "claim 9" and insert -- claim 8 --.

Signed and Sealed this
Twenty-sixth Day of December, 2023

Katherine Kelly Vidal
*Director of the United States Patent and Trademark Office*